United States Patent
Basu Mallick et al.

(10) Patent No.: US 10,405,297 B2
(45) Date of Patent: Sep. 3, 2019

(54) PAGING PROCEDURES FOR USER EQUIPMENTS WITH COVERAGE EXTENSION

(71) Applicant: Panasonic Intellectual Property Corporation of America, Torrance, CA (US)

(72) Inventors: Prateek Basu Mallick, Hessen (DE); Joachim Loehr, Hessen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/107,345

(22) Filed: Aug. 21, 2018

(65) Prior Publication Data
US 2018/0359725 A1 Dec. 13, 2018

Related U.S. Application Data

(63) Continuation of application No. 15/645,908, filed on Jul. 10, 2017, now Pat. No. 10,085,234, which is a (Continued)

(30) Foreign Application Priority Data

Feb. 23, 2015 (EP) .................................... 15156154

(51) Int. Cl.
*H04L 5/00* (2006.01)
*H04W 4/70* (2018.01)
(Continued)

(52) U.S. Cl.
CPC .............. *H04W 68/02* (2013.01); *H04L 5/006* (2013.01); *H04W 4/70* (2018.02); *H04W 88/02* (2013.01); *H04W 88/08* (2013.01)

(58) Field of Classification Search
CPC ....... H04W 4/70; H04W 68/02; H04W 80/02; H04W 88/08; H04L 5/0048
See application file for complete search history.

(56) References Cited

U.S. PATENT DOCUMENTS 10,085,234 B2 * 9/2018 Basu Mallick ....... H04W 68/02
2004/0047312 A1 3/2004 Muszynski et al.
(Continued)

FOREIGN PATENT DOCUMENTS

WO 2014/120055 A1 8/2014

OTHER PUBLICATIONS

3GPP TR 36.888 V12.0.0, "$3^{rd}$ Generation Partnership Project; Technical Specification Group Radio Access Network; Study on provision of low cost Machine Type Communications (MTC) User Equipements (UEs) based on LTE (Release 12)," Jun. 2013, 55 pages.

(Continued)

*Primary Examiner* — Diane D Mizrahi
(74) *Attorney, Agent, or Firm* — Seed IP Law Group LLP

(57) ABSTRACT

The present disclosure relates to a method for paging coverage extension UEs in a cell controlled by a radio base station. At least one CE-specific paging possibility is defined for paging CE-UEs. The CE-UEs in the cell regularly monitor the at least one CE-specific paging possibility. When the radio base station determines to page all the user equipments in the cell, it pages the CE user equipments in the cell at the CE-specific paging possibility, using a coverage extension technique. The disclosure also relates to a method for paging a CE-UE, which performs radio measurements by a CE-capable user equipment to determine whether coverage extension is necessary. The radio base station is informed about whether the CE-capable user equipment needs coverage extension and then pages the CE-UEs applying or not applying a CE technique depending on whether coverage extension is necessary.

12 Claims, 9 Drawing Sheets

Related U.S. Application Data continuation of application No. PCT/JP2016/000417, filed on Jan. 28, 2016.

(51) Int. Cl.
*H04W 68/02* (2009.01)
*H04W 88/02* (2009.01)
*H04W 88/08* (2009.01)

(56) References Cited

U.S. PATENT DOCUMENTS

| | | |
|---|---|---|
| 2008/0189970 A1 | 8/2008 | Wang et al. |
| 2011/0064059 A1 | 3/2011 | Hooli et al. |
| 2013/0136072 A1 | 5/2013 | Bachmann et al. |
| 2013/0203450 A1* | 8/2013 | Mochizuki ............ H04W 68/02 455/458 |
| 2014/0098761 A1 | 4/2014 | Lee et al. |
| 2014/0148204 A1 | 5/2014 | Zeira et al. |
| 2014/0378172 A1 | 12/2014 | Lim |
| 2015/0181575 A1* | 6/2015 | Ng ........................ H04L 5/0092 370/329 |
| 2016/0205659 A1 | 7/2016 | Bergman et al. |
| 2017/0171764 A1 | 6/2017 | Dimou et al. |

OTHER PUBLICATIONS

3GPP TS 36.214 V10.1.0, "3rd Generation Partnership Project; Technical Specification Group Radio Access Network; Evolved Universal Terrestrial Radio Access (E-UTRA); Physical layer; Measurements (Release10)", Dec. 22, 2010.
3GPP TS 36.304 V12.0.0, "3rd Generation Partnership Project; Technical Specification Group Radio Access Network; Evolved Universal Terrestrial Radio Access (E-UTRA); User Equipment (UE) procedures in idle mode (Release12)", Mar. 19, 2014.
3GPP TS 36.331 V12.4.1, "Radio Resource Control (RRC); Protocol specification (Release12)", Jan. 7, 2015.
3GPP TS 36.413 V12.4.0, "3rd Generation Partnership Project; Technical Specification Group Radio Access Network; Evolved Universal Terrestrial Radio Access Network(E-UTRAN); S1 Application Protocol (S1AP)(Release12)", Dec. 26, 2014.
3GPP TSG RAN Meeting #53, RP-111112, Vodafone: "Proposed SID: Provision of low-cost MTC UEs based on LTE", Sep. 2, 2011.
3GPP TSG RAN WG1#66bis, R1-112912, Huawei, HiSilicon, CMCC: "Overview on low-cost MTC UEs based on LTE", Oct. 3, 2011.
3GPP TSG RAN Meeting #66, RP-141865, "Revised WI: Further LTE Physical Layer Enhancements for MTC", Dec. 2, 2014.
3GPP TSG-RAN WG2 Meeting #89, R2-150531, "Signaling aspects for CE and reduced Bandwidth UEs", Feb. 2015.
3GPP TSG-RAN WG2 Meeting #89, R2-150402, "Considerations on idle mode Paging for Rel-13 Low Complexity UE", Feb. 2015.
3GPP TSG-RAN WG1 Meeting #80, R1-150064, "Paging transmission for MTC UEs", Feb. 2015.
3GPP TSG-RAN WG1 Meeting #80, R1-150082, "Enhancements to RAR and paging for MTC", Feb. 2015.
International Search Report, dated Apr. 19, 2016, for International Application No. PCT/JP2016/000417, 2 pages.
Sesia et al., "Theory to Practice," Second Edition, ISBN 9780470660256, section 3.4, Jul. 2011, pp. 84-86.

* cited by examiner

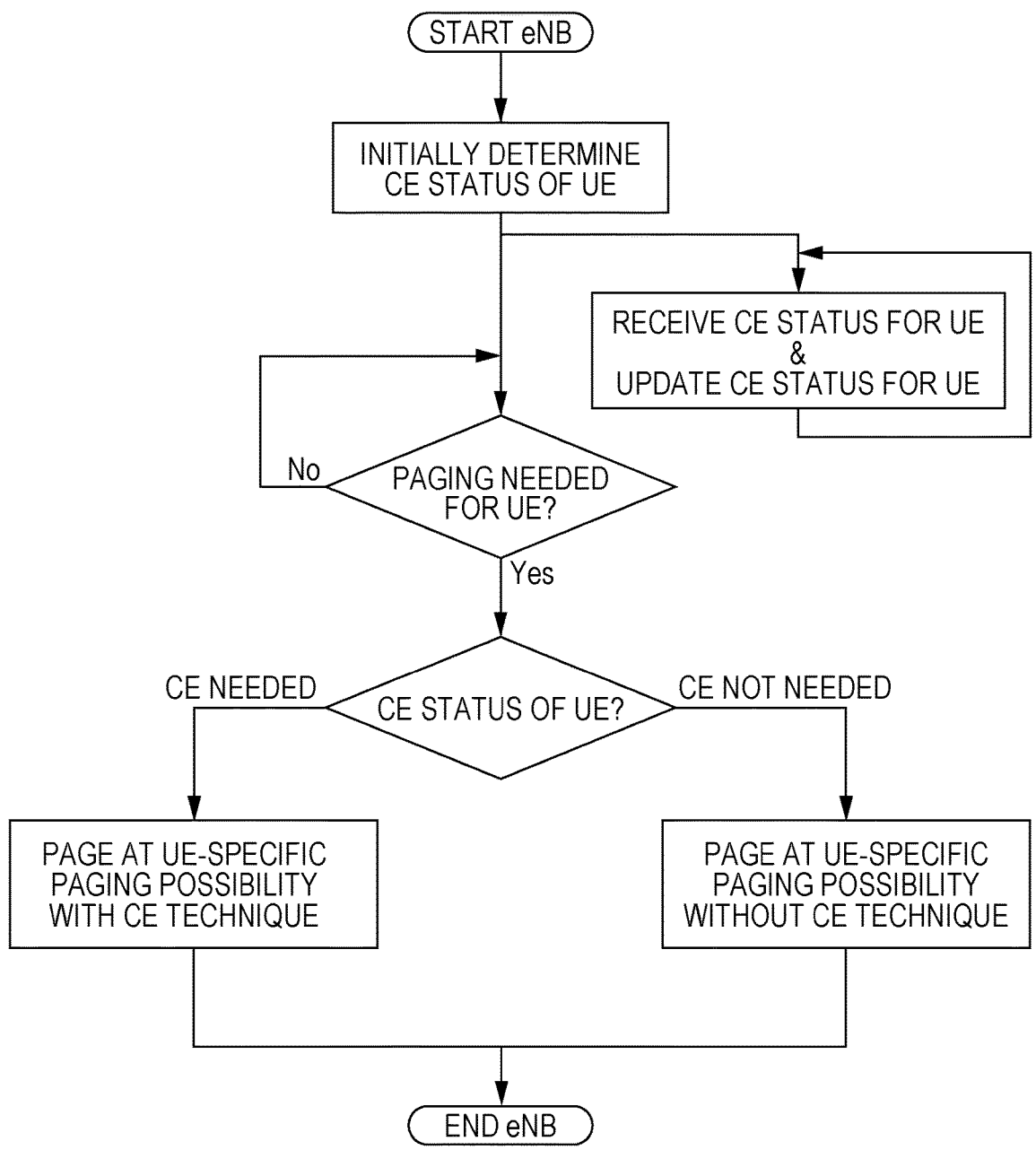

PAGING PROCEDURES FOR USER EQUIPMENTS WITH COVERAGE EXTENSION

BACKGROUND

Technical Field

The present disclosure relates to methods for paging one or several user equipments in a cell of a radio base station, where the user equipment(s) do require coverage extension to be reliably paged. The present disclosure is also providing the user equipment and radio base station for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMES/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

LTE RRC States

LTE is based on only two main states: "RRC_IDLE" and "RRC_CONNECTED".

In RRC_IDLE the radio is not active, but an ID is assigned and tracked by the core network. More specifically, a mobile terminal in RRC_IDLE performs cell selection and reselection, in other words, it decides on which cell to camp. The cell (re)selection process takes into account the priority of each applicable frequency of each applicable Radio Access Technology (RAT), the radio link quality and the cell status (i.e. whether a cell is barred or reserved). An RRC_IDLE mobile terminal monitors a paging channel to detect incoming calls, and also acquires system information. The system information mainly consists of parameters by which the network (E-UTRAN) can control the cell (re) selection process and also how the mobile terminal accesses the network. RRC specifies the control signaling applicable for a mobile terminal in RRC_IDLE, namely paging and system information. The mobile terminal behavior in RRC_IDLE is specified in more detail e.g. in 3GPP TS 36.304, "Evolved Universal Terrestrial Radio Access (E-UTRA); User Equipment (UE) procedures in idle mode", version 12.0.0, chapter 4 "General description of Idle mode" incorporated herein by reference.

In RRC_CONNECTED the mobile terminal has an active radio operation with contexts in the eNodeB. The E-UTRAN allocates radio resources to the mobile terminal to facilitate the transfer of (unicast) data via shared data channels. To support this operation, the mobile terminal monitors an associated control channel which is used to indicate the dynamic allocation of the shared transmission resources in time and frequency. The mobile terminal provides the network with reports of its buffer status and of the downlink channel quality, as well as neighboring cell measurement information to enable E-UTRAN to select the most appropriate cell for the mobile terminal. These measurement reports include cells using other frequencies or RATs. The UE also receives system information, consisting mainly of information required to use the transmission channels. To extend its battery lifetime, a UE in RRC_CONNECTED may be configured with a Discontinuous Reception (DRX) cycle. RRC is the protocol by which the E-UTRAN controls the UE behavior in RRC_CONNECTED.

The various functions of the mobile terminal in RRC Protocol for and including Connected Mode are described in 3GPP TS 36.331, "Evolved Universal Terrestrial Radio Access (E-UTRA); Radio Resource Control (RRC); Protocol specification", version 12.4.1, in Ch. 4 "Functions", incorporated herein by reference.

Paging

The present application will differentiate between two types of paging, namely the paging initiated from the non-access stratum (NAS) (termed exemplarily in the following "Paging-NAS") and the paging initiated from the eNodeB (termed exemplarily in the following "Paging-eNB"). Paging-NAS relates to the paging of a particular UE e.g. when paging a UE in connection with an incoming data connection e.g. a mobile-terminating (MT) call. On the other hand, paging-eNB relates to the paging of all the UEs in the cell, and e.g. is used to inform them about a system information change, ETWS message (Earthquake and Tsunami Warning System), CMAS message (Commercial Mobile Alert System) etc. Furthermore, depending on whether the UE is in RRC idle or connected state, the actual paging messages are transmitted differently to the UE. However, the two paging procedures have a lot in common too.

In general, the UE in RRC_Idle state monitors for paging to detect incoming calls, system information change, for ETWS capable UEs, ETWS notification, and for CMAS capable UEs, CMAS notification. The UE in RRC_Connected state monitors for paging and/or System Information Block Type 1 contents to detect system information change, for ETWS capable UEs, ETWS notification, and for CMAS capable UEs, CMAS notification (see 3GPP TS 36.331, current version v12.4.1, subclause 4.2.1, incorporated herein by reference).

The general paging procedure for transmitting the paging message from EUTRAN to the UE is defined in TS 36.331, current version 12.4.1, subclause 5.3.2 incorporated herein by reference, describing that the purpose of the paging procedure is:

to transmit paging information to a UE in RRC_IDLE (Paging-NAS) and/or;

to inform UEs in RRC_IDLE and UEs in RRC_CONNECTED about a system information change (Paging-eNB) and/or;

to inform about an ETWS primary notification and/or ETWS secondary notification (Paging-eNB) and/or;

to inform about a CMAS notification (Paging-eNB).

The paging information received in the UE is provided to upper layers, which in response e.g. may the initiate RRC connection establishment to receive an incoming call.

E-UTRAN performs the paging procedure by transmitting the Paging message at the UE's paging occasion as specified in TS 36.304. E-UTRAN may address multiple UEs within a Paging message by including one PagingRecord for each UE.

To receive paging messages from E-UTRAN, UEs in idle mode monitor the PDCCH channel for an RNTI value used to indicate paging: the P-RNTI (Paging radio network temporary identity) which is a common RNTI, i.e. not allocated to any UE explicitly. The UE only needs to monitor the PDCCH channel at certain UE-specific paging possibilities, i.e. at specific subframes within specific radio frames as will be discussed in more detail in the following. The E-UTRAN configures which of the radio frames and subframes can be used for paging in its cell. Each cell broadcasts a default paging cycle Tc, and in addition, upper layers may use dedicated signaling to configure a UE-specific paging cycle TUE; if both are configured, the UE applies the lowest value for the DRX cycle T of the UE.

In order to explain the procedure for paging as currently defined for LTE-A, the following exemplary cases A, B, and C are defined, as taken from the book LTE—The UMTS Long Term Evolution—From Theory to Practice, Edited by: Stefania Sesia, Issam Toufik, and Matthew Baker, Second Edition, ISBN 9780470660256, section 3.4.

TABLE 1

| Case | UE_ID | $T_c$ | $T_{UE}$ | T | nB | N | Ns | PF | i_s | PO |
|------|-------|-------|----------|-----|-----|-----|----|----|-----|----|
| A | 147 | 256 | 256 | 256 | 64 | 64 | 1 | 76 | 0 | 9 |
| B | 147 | 256 | 128 | 128 | 32 | 32 | 1 | 76 | 0 | 9 |
| C | 147 | 256 | 128 | 128 | 256 | 128 | 2 | 19 | 1 | 4 |

The following parameters are used in said respect:

"TC" is the cell-specific default paging cycle, and can be 32, 64, 128, or 256 radio frames, "TUE" is the UE-specific paging cycle of the UE, and can be 32, 64, 128, or 256 radio frames, "N" is the number of paging frames within the paging cycle of the UE, and is min (T, nB), Ns is the number of paging subframes in a radio frame that may be used for paging, and is max (1, nB/T), nB is the number of paging subframes per paging cycle (across all UEs in the cell), and can be 4T, 2T, T, T/2, T/4, T/8, T/16, T/32; the parameter determines to a large extent the paging capability of the eNB across all UEs in the cell. In general, if nB is set equal to or larger than T, all radio frames may be used for paging (see also parameter N), and there are nB/T POs per PF (see also parameter Ns). In turn, if nB is set lower than T, only a fraction nB/T of the radio frames may be used for paging (see also parameter N), and there is one PO per PF (see also parameter Ns).

"T" is the DRX cycle of the UE (also termed paging cycle), is min of TC and TUE, and specifies how frequently a UE monitors for paging, where a shorter DRX cycle decreases the time for paging but increases battery consumption.

For example, for cases A and B E-UTRAN has configured one out of every four radio frames and specifically one subframe in each of those radio frames, to be used for paging (see T, Ns, respectively). For case C, there are two subframes in each radio frame that can be used for paging, i.e. Ns=2, and 128 paging frames within the UE's paging cycle, i.e. N=128, available for paging the UEs in the cell. Furthermore, for case B, there are 32 paging frames within the UE's paging cycle (N=32). Across these generally-available paging opportunities configured by the eNB, the paging possibilities for paging the UEs are distributed based on the UE identity.

In said respect, the particular radio frame and subframe used for paging a particular UE is calculated as follows. A Paging Occasion (PO) is a subframe where there may be a P-RNTI (Paging radio network temporary identity) transmitted on PDCCH addressing the paging message. A Paging Frame (PF) is a radio frame, which may contain one or multiple Paging Occasion(s). In the context of this patent application, the term paging possibility shall refer to the combination of the paging frame and paging subframe.

The paging frames and paging occasions are defined for example in 3GPP TS 36.304, current version 12.0.0, sub-clause 7, incorporated herein by reference. Accordingly, the paging frame number (SFN) is calculated according to the following formula:

$$\text{SFN mod } T = (T \text{ div } N)*(\text{UE\_ID mod } N)$$

where UE_ID is IMSI mod 1024.

When assuming an UE_ID of 147 for all three cases A, B, and C, calculating the above formula results in the paging frame 76 for cases A and B, and paging frame 19 for case C. Furthermore, i_s would be calculated to be 0 for cases A and B, and be 1 for case C.

The paging occasion has values in the range of [0, 1, . . . 9], as in LTE there are 10 subframes within one radio frame. The paging occasion number is selected from a preconfigured table based on the parameters Ns and i_s calculated according to the following formula:

$$i\_s = \text{floor}(\text{UE\_ID}/N) \text{mod } Ns.$$

The following table is taken from TS 36.304, current version 12.0.0, and is used to determine the Paging Occasion for a particular UE, based on the above parameters Ns and i_s. The following table is intended for FDD.

TABLE 2

| PO when i_s = 0 | PO when i_s = 1 | PO when i_s = 2 | PO when i_s = 3 |
|---|---|---|---|
| 9 | N/A | N/A | N/A |
| 4 | 9 | N/A | N/A |
| 0 | 4 | 5 | 9 |

(Ns values: 1, 2, 4)

Therefore, for case A and B, with Ns=1 and i_s=0, the table would yield the subframe number 9, such that the UE for cases A and B would be paged regularly in subframe 9 of radio frame 76 of every paging cycle; i.e. for case A next radio frame 332 and for case B next radio frame 204 etc. For case C, the UE would be paged regularly in subframe 4 of radio frame 19 of every paging cycle, i.e. next radio frame 147 etc.

The paging frame and paging occasion for the above-discussed cases B and C, is exemplarily depicted in FIG. 3.

Paging-NAS

For instance, in order to re-establish a connection towards a UE in idle mode, the MME—having been informed e.g. by the UE's P/SGW—sends a paging request message to all eNBs that are part of the so-called tracking area(s) to which the UE belongs and within which the UE can move without having to perform the Tracking Area Update (TAU) procedure (except the periodic TAU procedure).

When receiving the paging request, the eNodeB(s) of the tracking area(s) then broadcast(s) another paging message over the radio interface in the cells. The UE is notified about the paging based on the P-RNTI on the PDCCH and then receives the paging message transmitted over the PDSCH, in the radio resources as indicated by the PDCCH paging notification. When the UE in RRC idle receives the paging message/signal, it transfers from IDLE to CONNECTED state and establishes an RRC connection with that eNB where it is camped in IDLE mode (e.g. the UE initiates the RRC connection establishment procedure).

A system overview and message exchange is exemplarily illustrated in FIG. 4, assuming that the UE to be paged by the MME (as triggered by the SGW) is registered at tracking areas TAC1 and TAC3. Consequently, the MME will provide the S1AP paging request to the eNBs of those tracking areas, which in turn will transmit a page at the UE-specific paging possibility (i.e. the PDCCH notification) and then the paging message on the PDSCH resources. The UE is consequently notified about the paging, receives the paging message on the PDSCH, and after confirming its own identity in the paging message, processes the paging message and responds to the paging by e.g. by sending a service request to the MME.

In the current LTE system, the paging message transmitted from the MME to the eNB, and its content, are defined e.g. by 3GPP TS 36.413, "Evolved Universal Terrestrial Radio Access Network (E-UTRAN); S1 Application Protocol (S1AP)", version 12.4.0, in sub-clauses 8.5 and 9.1.6, incorporated herein by reference. The paging message from the MME to the eNB contains amongst other the following information:

UE_ID Index Value: known as UE_ID, which is calculated by (IMSI mod 1024). Correspondingly, the UE_ID may have values in the range of [0, 1 . . . 1023].

UE Paging Identity: can be the IMSI (as stored on the SIM card) or the SAE-Temporary Mobile subscriber ID (S-TMSI) assigned to the UE during the attach procedure. The UE Paging Identity is transmitted from the eNB to the UE in a paging message over the radio interface (i.e. Uu interface).

Paging DRX cycle: is the Discontinuous Reception (DRX) cycle configured in the UE (using NAS signaling) or the default DRX cycle broadcast in the System Information Block (SIB). The default DRX cycle is also known as Paging Cycle in the RadioResourceConfigCommon SIB. The UE may use discontinued reception in IDLE mode in order to reduce power consumption. The DRX cycle is a time interval between monitoring Paging Occurrences for a specific UE. The values of the default DRX/paging cycle broadcast in the SIB are 32, 64, 128 or 256 radio frames.

UE radio Capability for paging: including the radio access capabilities of the UE, including the coverage extension capability.

The paging message transmitted from the eNodeB is broadcast in a defined paging possibility as explained above. Paging possibilities are known to the eNodeB and the UE so that they send/listen to the paging message at the same time.

When Discontinues Reception (DRX) is used, the UE needs only to monitor one PO per DRX cycle.

As mentioned before, the paging initiated by the non-access stratum (NAS) is UE specific. Consequently, the UE is paged by using the IMSI (or S-TMSI) of the UE as paging identity in the paging message sent in the PDSCH. Therefore, for each UE a separate paging message has to be transmitted from the MME to the eNB(s), which has then to be broadcast from the corresponding eNB(s).

The paging message transmitted from the eNodeB to the UE is defined in TS 36.331, current version 12.4.1, subclause 6.2.2 Message definition, section "Paging", incorporated herein by reference. This message may contain the following:

cmas-Indication: if present, indication of a CMAS notification
cn-Domain: indicates the origin of paging
eab-ParamModification: if present, indication of an EAB parameter (SIB14) modification
etws-Indication: if present, indication often ETWS primary/secondary notification
imsi: The International Mobile Subscriber Identity, a globally unique permanent subscriber identity; can also be part of the Paging UE-Identity below
systemInfoModification: if present, indication of a BCCH modification, other than SIB10-SIB12, SIB14
ue-Identity: provides the NAS identity of the UE that is being paged In the above description, it has been assumed that the UE is in an idle state when receiving the paging, such that the paging message is sent to the UE addressed to the P-RNTI on PDCCH at the UE-specific paging possibilities (based on IMSI of this UE) where the UE verifies that the paging message is indeed intended for it by checking the IDs in the included paging records.

However, also UEs in RRC connected state may be paged. In this case a downlink information transfer (DLInformationTransfer), containing the paging related information from the NAS, is sent to the UE addressed to the C-RNTI (Cell-RNTI, a unique ID used for identifying RRC connection and scheduling dedicated to a particular UE) on the PDCCH. The DLInformationTransfer message is used for the downlink transfer of NAS or non-3GPP dedicated information. The RRC layer is transparent for this information. For more information, reference is made to TS 36.331, current version 12.4.1, subclause 5.6.1 "DL information transfer" and 6.2.2 "Message definitions" section DLInformationTransfer, incorporate herein by reference.

Paging from eNB

One of the reasons for an eNodeB to page the UE is a change of system information. In general a change of system information only occurs at specific radio frames, thus implementing the concept of a modification period. System information may be transmitted a number of times with the same content within a modification period. When the network changes (some of) the system information, it first notifies the UEs about this change, which may be done throughout a modification period. In the next modification period, the network then transmits the updated system information. Upon receiving a change notification, the UE acquires the new system information immediately from the start of the next modification period. A paging message is used to inform the UEs in RRC idle and UEs in RRC connected state about a system information change (as mentioned e.g. in TS 36.304, current version 12.0.0, subclause 6.1). If the UE receives a paging message including the systemInfoModification, it knows that the system information will change at the next modification period and boundary. In said case, the UE does not need to check for the UE_ID (not included in the paging message), in view of the presence of the systemInfoModification. Further information in said respect can be found in TS 36.331, current version 12.4.1, subclause 5.2.1.3, incorporated herein by reference.

Another reason for the eNodeB to page the UEs is an ETWS (Earthquake and Tsunami Warning system) notification, where the paging message is used to inform ETWS-capable UEs in RRC idle and in RRC connected state about the presence of an ETWS primary/secondary notification. Further information in said respect can be found in TS 36.331, current version 12.4.1, subclause 5.2.1.4, incorporated herein by reference. The paging message may also be used to inform CMAS-capable UEs in RRC idle and RRC connected state about the presence of one or more CMAS (Commercial Mobile Alert System) notifications. Further information in said respect can be found in TS 36.331, current version 12.4.1, subclause 5.2.1.5, incorporated herein by reference. Still another reason for the eNB to page UEs in its cell relates e.g. to Enhanced Access Barring for MTC devices, EAB, as explained for example in TS 36.331, current version 12.4.1, subclause 5.2.1.6 incorporated herein by reference.

For UEs in both RRC connected and idle state the eNB sends a paging notification to the UE(s) addressed to the P-RNTI on the PDCCH at all possible paging occasions (e.g. at subframes 0, 4, 5, and 9) and at all possible paging frames (e.g. N different radio frames in total, calculated according to SFN mod T=T/N (UE_ID mod N) for every possible "UE_ID mod N" value) irrespective of the IMSI of a particular UE in the cell. By transmitting the paging message at all possible paging possibilities within a paging cycle, the eNB ensures that all the UEs receive the paging message. The detailed definitions for determining the paging occasions and paging frames are given above.

Machine Type Communication (MTC)

As LTE deployments evolve, operators strive to reduce the cost of overall network maintenance by minimizing the number of RATs. In this respect, Machine-Type Communications (MTC) devices is a market that is likely to continue expanding in the future.

Many MTC devices are targeting low-end (low cost, low data rate) applications that can be handled adequately by GSM/GPRS. Owing to the low cost of these devices and good coverage of GSM/GPRS, there is very little motivation for MTC device suppliers to use modules supporting the LTE radio interface.

As more and more MTC devices are deployed in the field, this naturally increases the reliance on GSM/GPRS networks. This will cost operators not only in terms of maintaining multiple RATs, but also prevent operators reaping the maximum benefit out of their spectrum (given the non-optimal spectrum efficiency of GSM/GPRS). With users and traffic becoming denser, using more spectral-efficient technologies, such as Long Term Evolution (LTE), allow the operators to utilize their spectrum in a much more efficient way.

Given the likely high number of MTC devices, the overall resource they will need for service provision may be correspondingly significant, and inefficiently assigned (for further details on objectives for MTC, see for example 3GPP, RP-111112, Vodafone: "Provision of low-cost MTC UEs based on LTE", section 4, available at http://www.3gpp.org and incorporated herein by reference).

Approaches to lower the cost of LTE presently regard the volume of products as the primary reason. The impact of volume can be seen in two possible ways, depending on how low-cost MTC is developed. Firstly, if low-cost MTC may be very similar to mainline LTE and included in LTE chipsets, MTC has the benefit of the volume of LTE. Secondly, a low-cost MTC based on LTE may have significantly lower cost than mainline LTE. Although it appears not to have the volume benefit of LTE, the volume of MTC devices can be even larger due to a potentially greater number of supported MTC applications and scenarios.

In this respect, the following approaches to lower the cost of LTE, i.e. defining low-cost MTC are discussed and found to have significant UE cost impact (for further details on low-cost MTC devices, see for example 3GPP, R1-112912, Huawei, HiSilicon, CMCC: "Overview on low-cost MTC UEs based on LTE", section 4, available at http://www.3gpp.org and incorporated herein by reference):

Reduction in supported bandwidth for the low-cost LTE:
The low cost of 1.4 MHz (6 RB) downlink bandwidth could cover most application scenarios of MTC. However, 3 MHz (15 RB) or 5 MHz (25 RB) could be considered given that the complexity does not increase much. Given that the uplink may have a larger requirement for MTC services, the possibility of reduced transmit power, and small baseband complexity (relative to downlink reception), any reduction in minimum transmission bandwidth in the UE should be carefully justified.

Modified PDCCH-related design for the low-cost LTE to simplify the PDCCH blind decoding and give efficient channel access for a large number of MTC devices. A reduction in maximum bandwidth (e.g., 1.4 MHz) decreases PDCCH blind decoding naturally.

Protocol simplification including HARQ consideration, MAC, RLC and RRC protocol. Signaling reduction between low duty cycle MTC devices and the base station.

Transmission modes down-selection to maintain coverage and balance complexity.

Further considerations on low-cost MTC devices relate to an improved indoor coverage. A number of applications require indoor deployment of Machine Type Communication, MTC, devices, e.g. in an apartment basement, or on indoor equipment that may be close to the ground floor etc. These UEs would experience significantly greater penetration losses on the radio interface than normal LTE devices. This effectively means that indoor coverage should be readily available and reliable: i.e. should provide a significant improvement on existing coverage.

Additionally, regarding the power consumption of low-cost MTC devices it is noted that many applications require devices to have up to ten years of battery life. In this respect, presently available Power Save Modes appear not sufficient to achieve the envisaged battery life. In this respect, it is anticipated that further techniques are proposed to significantly cut down the power usage of MTC devices e.g. by optimizing signaling exchanges in the system, in order to realize battery life of up to ten years.

Enhanced Coverage Mode (EC Mode)

For improving indoor coverage (for low-cost MTC devices), recent developments have focused on an Enhanced Coverage, EC, mode that is applicable to UEs e.g. operating delay tolerant MTC applications. Another term is "Coverage Extension". The corresponding Work Item in 3GPP Release 12 "Low cost & enhanced coverage MTC UE for LTE" came to the conclusion that further complexity reduction of LTE devices for MTC can be achieved if additional complexity reduction techniques are supported, as apparent from the study report TR 36.888. The study report TR 36.888 concluded that a coverage improvement target of 15-20 dB for both FDD and TDD in comparison to a normal LTE footprint could be achieved to support the use cases where MTC devices are deployed in challenging locations, e.g. deep inside buildings, and to compensate for gain loss caused by complexity-reduction techniques. MTC coverage enhancements are now expected to be introduced in 3GPP Release 13.

The general objective is to specify a new UE for MTC operation in LTE that allows for enhanced coverage and lower power consumption. Some of the additional objectives are given below:

Reduced UE bandwidth of 1.4 MHz in downlink and uplink.
Bandwidth reduced UEs should be able to operate within any system bandwidth.
Frequency multiplexing of bandwidth reduced UEs and non-MTC UEs should be supported.
The UE only needs to support 1.4 MHz RF bandwidth in downlink and uplink.
The allowed re-tuning time supported by specification (e.g. ~0 ms, 1 ms) should be determined by RAN4.

Reduced maximum transmit power.
The maximum transmit power of the new UE power class should be determined by RAN4 and should support an integrated PA implementation.

Reduced support for downlink transmission modes.
The following further UE processing relaxations can also be considered within this work item:
Reduced maximum transport block size for unicast and/or broadcast signaling.
Reduced support for simultaneous reception of multiple transmissions.
Relaxed transmit and/or receive EVM requirement including restricted modulation scheme. Reduced physical control channel processing (e.g. reduced number of blind decoding attempts).
Reduced physical data channel processing (e.g. relaxed downlink HARQ time line or reduced number of HARQ processes).
Reduced support for CQI/CSI reporting modes.

A relative LTE coverage improvement—corresponding to 15 dB for FDD—for the UE category/type defined above and other UEs operating delay-tolerant MTC applications with respect to their respective normal coverage shall be possible. At least some of the following techniques, which shall be applicable for both FDD and TDD, can be considered to achieve this:

Subframe bundling techniques with HARQ for physical data channels (e.g. PDSCH, PUSCH)
Elimination of use of control channels (e.g. PCFICH, PDCCH)
Repetition techniques for control channels (e.g. PBCH, PRACH, (E)PDCCH)
Either elimination or repetition techniques (e.g. PBCH, PHICH, PUCCH)
Uplink PSD boosting with smaller granularity than 1 PRB
Resource allocation using EPDCCH with cross-subframe scheduling and repetition (EPDCCH-less operation can also be considered)
New physical channel formats with repetition for SIB/RAR/Paging
A new SIB for bandwidth reduced and/or coverage enhanced UEs
Increased reference symbol density and frequency hopping techniques Relaxed "probability of missed detection" for PRACH and initial UE system acquisition time for PSS/SSS/PBCH/SIBs can be considered as long as the UE power consumption impact can be kept on a reasonable level.

Spreading: Spreading refers to spreading of information across resources including time-frequency domain resources or even spreading using Scrambling (or Channelization) codes.

There can be also other techniques than those listed above. The amount of coverage enhancement should be configurable per cell and/or per UE and/or per channel and/or group of channels, such that different levels of coverage enhancements exist. The different levels of coverage enhancement could mean different level of CE techniques being applied to support the CE-device transmission and reception. Relevant UE measurements and reporting to support this functionality should be defined.

For more details, see for example 3GPP RP-141865 "Revised WI: Further LTE Physical Layer Enhancements for MTC" sourced by Ericsson, available at http://www.3gpp.org and incorporated herein by reference.

Notably, coverage enhancements of 15/20 dB for UEs in the Enhanced Coverage mode with respect to their nominal coverage means that the UEs have to be capable of receiving extremely low signal strengths. This applies not only to the initial scanning operation, the cell search and the cell selection operation but also the subsequent communication scheme to be performed by the UE.

Early attempts to define the Enhanced Coverage mode have focused on modifications of the radio transmissions. In this respect, discussions have focused on repeated transmissions as being the main technique to improve the coverage. Repetitions can be applied to every channel for coverage improvement.

An exemplary implementation of these repeated transmissions prescribes that the same data is transmitted across multiple sub-frames. Yet, it will become immediately apparent that these repeated transmissions will use more resource blocks (time-frequency) resources than required for normal coverage UEs.

SUMMARY

One non-limiting and exemplary embodiment provides an improved method for paging all user equipments in a cell, particularly involving user equipments which need coverage extension. Another non-limiting and exemplary embodiment provides an improved method for paging one user equipment in a cell, particularly a user equipment which needs coverage extension. The independent claims provide non-limiting and exemplary embodiments. Advantageous embodiments are subject to the dependent claims.

In one general aspect, the techniques disclosed here feature a method for paging a user equipment in a cell controlled by a radio base station in a mobile communication system. The user equipment supports coverage extension techniques, and the radio base station is capable of using one of a plurality of techniques for achieving a coverage extension for a CE-capable user equipment. The method includes the steps of: performing radio measurements by the CE-capable user equipment; determining by the CE-capable user equipment whether coverage extension is necessary or not, based on results of the radio measurements, wherein the radio base station is informed about whether the CE-capable user equipment needs coverage extension or not, based on a determination result; and when paging the CE-capable user equipment, applying or not applying by the radio base station one of the plurality of techniques for achieving coverage extension depending on whether coverage extension is necessary or not for the CE-capable user equipment.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE DRAWINGS

FIG. 10 shows a sequence diagram for the eNB behavior according to one exemplary second embodiment.

DETAILED DESCRIPTION

Figure 1:
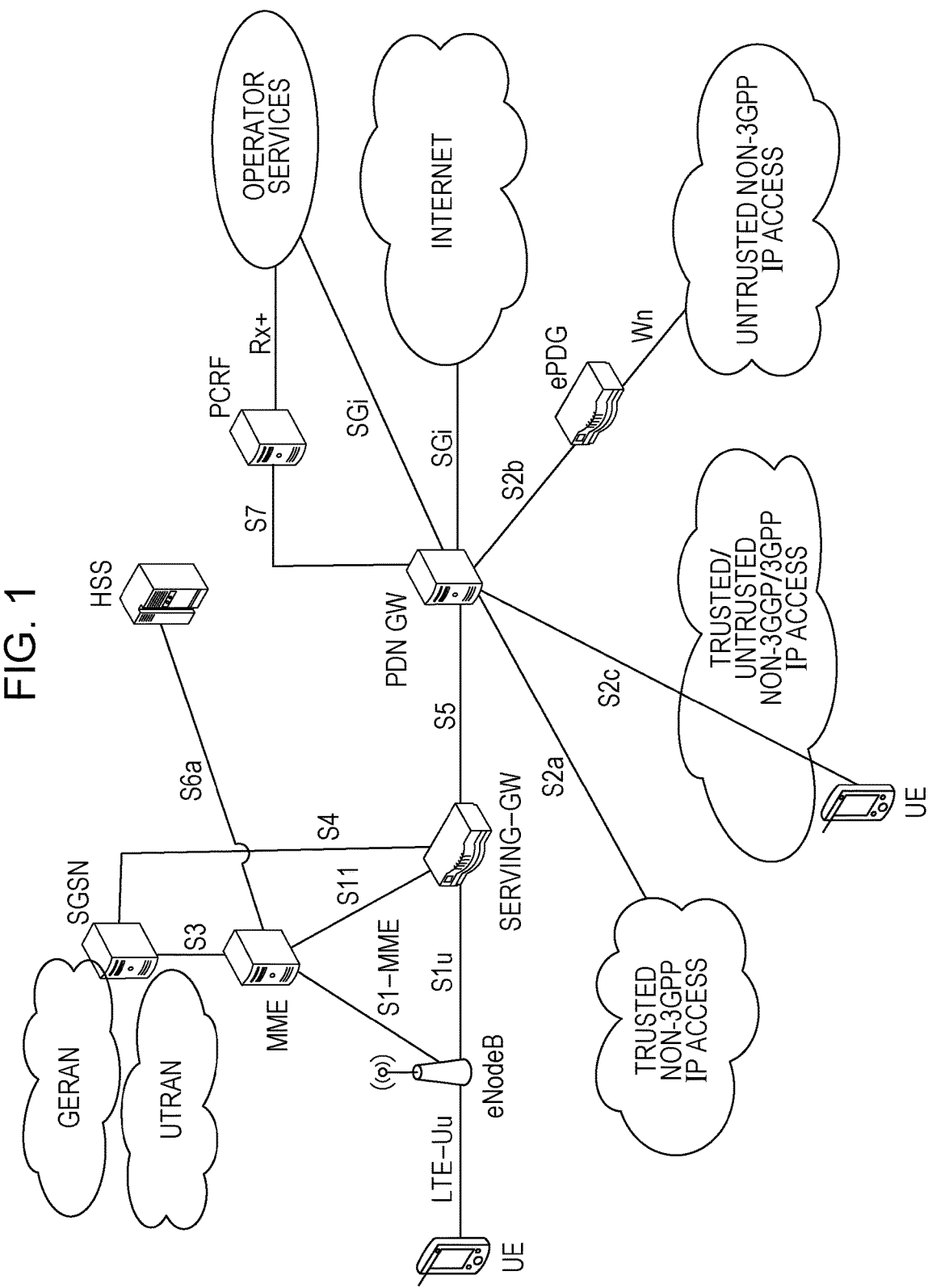
FIG. 1 shows an exemplary architecture of a 3GPP LTE system.
Figure 2:
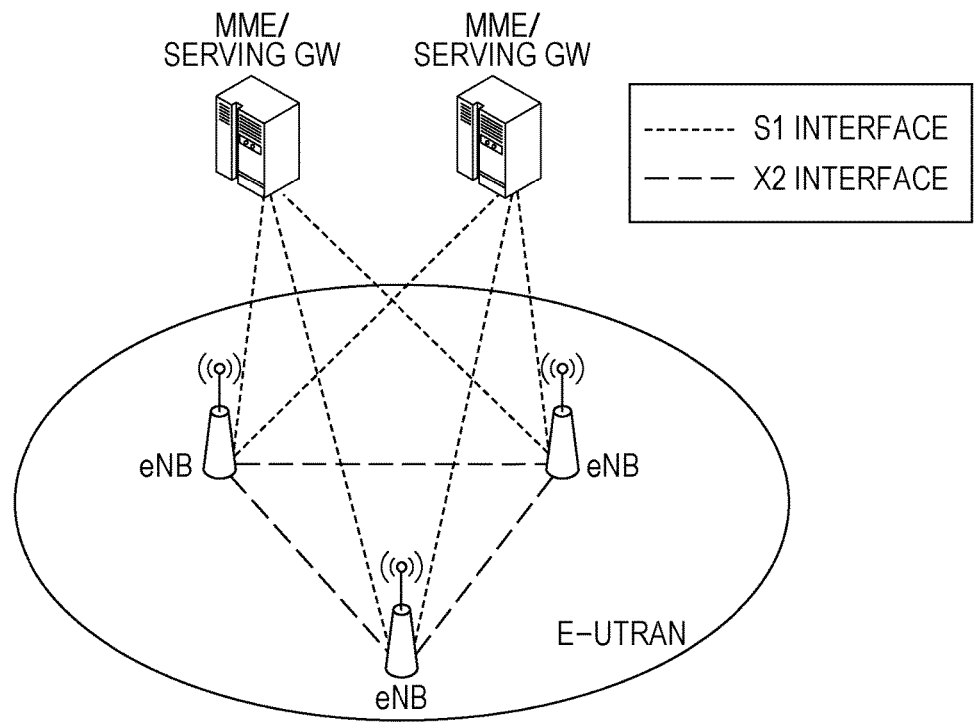
FIG. 2 shows an exemplary overview of the overall E-UTRAN architecture of 3GPP LTE.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "paging possibility" as used in the set of claims and in the application is to be broadly understood as referring to physical radio resources (frequency-time resources) of a control channel (e.g. the PDCCH), which are defined by a radio frame number (also termed paging frame, PF) and a subframe number (also termed paging occasion, PO).

The expression "coverage-extension UE" (or "CE UE") as used in the application is to be broadly understood as referring to a UE which requires coverage extension, e.g.

because it is in a bad radio condition. The expression "CE-capable UE" shall be used for a UE supporting the coverage extension techniques, irrespective of whether or not the UE indeed requires coverage extension, i.e. a UE can support coverage extension techniques but can still be understood as a "non-CE UE" in case that no coverage extension is currently necessary. From eNB-perspective, it may be unclear at any particular point in time whether a CE-capable UE indeed requires coverage extension or not. The second embodiment is directed at said drawback.

Correspondingly, the expression "non-CE-UE" as used in the application is to be broadly understood as referring to a UE which either does not require coverage extension (even when actually supporting the corresponding CE techniques) or does not support coverage extension techniques.

The expression "UE-specific paging possibility" as used in the set of claims and in the application is to be broadly understood as that paging possibility which is calculated based on the UE-ID (e.g. IMSI), and should be understood in the context of the CE-specific paging possibility which is specific to only coverage extension. As described in the background section, there is only a limited amount of paging possibilities available, across which the UEs are then disposed depending on their IDs. Although a particular paging possibility may be monitored by several UEs, the paging possibilities are UE-specific in the sense that the paging possibility to be monitored by a UE is determined based on the respective UE-ID.

The terms "paging notification" and "paging message" are distinguished in the set of claims and in the application to respectively refer to the first PDCCH message (which is basically an indication notifying about a paging message e.g. by use of the common P-RNTI) and the subsequent PDSCH message with the actual paging information. The term "paging" does not make this distinction and shall cover both.

The term "CE-page" or "CE-paging" as used in the application shall refer broadly to a paging where one out of a plurality of coverage extension techniques is used. For example, when considering the repetition technique as the CE-technique used by an eNB, the "CE-page" will involve repeating the transmission of both paging messages, i.e. the paging notification on the PDCCH and the actual paging message on the PDSCH, for a pre-configured number of times as defined for the repetition technique.

As explained in the background section, coverage extension techniques are to be implemented for (MTC) devices, and it is unclear how the coverage extension shall be achieved for the paging procedure. However, expenditure is quite high for any of these techniques, such that they should be only used when necessary. For the paging which is initiated by the eNB, and is directed to all UEs in the cell, the currently-implemented paging is applied to all possible paging possibilities so as to reach all UEs. In order to reach also the CE-UEs, a coverage extension technique may be applied to the paging at all possible paging possibilities, which however results in a high expenditure of resources.

For the paging which is initiated by the NAS, and is directed to one UE only (or a very limited number of UEs), the MME inform the eNB over the S1 interface about the capability of a RRC_Connected UE to allow coverage extension and thus to support the coverage enhancement techniques mentioned above. However, it is unclear whether the UE is actually requiring coverage extension at the time of the page, (e.g. the UE, e.g. MTC device, moved from the cellar to open terrain). Consequently, the eNB might page the UE at the UE-specific paging possibility by using one of the CE techniques, even though the UE is in a good radio condition and would not have needed a coverage extension page. Again, resources are wasted.

The following exemplary embodiments are conceived by the inventors to mitigate the problems explained above.

Some of these are to be implemented in the wide specification as given by the 3GPP standards and explained partly in the background section, with the particular key features as explained in the following pertaining to the various embodiments. It should be noted that the embodiments may be advantageously used for example in a mobile communication system, such as 3GPP LTE-A (Release 10/11/12/13) communication systems as described in the background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the present disclosure and its embodiments as such.

In the following a set of embodiments will be explained. Although in the following embodiments, the broad expressions UE, CE-UE, CE-capable UE, are used, the embodiments may be equally applied for MTC devices, i.e. a CE-MTC device or CE-capable MTC device etc.

First Embodiment

According to a first exemplary embodiment, a paging procedure according to which the eNB can page all the UEs in its cell, including those UEs which require coverage extension (and of course also support coverage extension), is presented.

For this first embodiment it is assumed that the paging is initiated (i.e. triggered) by the eNB itself; in contrast to paging being initiated by the Non-Access-Stratum for which the second embodiment provides an improved paging procedure. As already explained in the background section, paging may be initiated by the eNB for several reasons. For example, system information applicable to the cell may change, and the eNB wants to notify the UEs in its cell such that the UEs may acquire the updated system information immediately from the start of the next modification period. Another reason is that a warning message shall be broadcast in the cell, such as a message from the ETWS or CMAS system, or a message in relation to EAB (Enhanced Access Barring for MTC devices). More detailed information is omitted here, and reference is made to the corresponding passages in the background section which equally apply to the first embodiment.

Consequently, due to nature of those reasons, the eNB wants to make sure that the paging reaches all UEs in the cell, including those UEs which need coverage extension to be successfully reached. According to the first embodiment, a paging possibility is established for specifically paging those CE-UEs, termed in the following CE-specific paging possibility. More precisely, a CE-specific paging frame and a CE-specific subframe are defined referring to radio resources of the PDCCH that can be used for the CE-paging. In a similarly manner as for the UE-specific paging possibilities defined in the current systems, the CE-specific paging possibility shall occur regularly, e.g. in a cyclic manner according to the paging cycle followed by the UE. The CE-specific paging possibility can be defined in addition to the normal UE-specific paging possibilities already established by the related art, as discussed in the background section. The CE-specific paging possibility is independent from the UE's identity and shall be the same for a plurality of CE-UEs, e.g. CE-UEs of a particular cell or all CE-UEs in general (or at least all CE-UEs of a specific CE level as will be explained later); this is different from the normal UE-specific paging possibility which—even though several UEs may monitor the same paging possibility—is specific to the UE due to being calculating based on the ID of the UE(s). This CE-specific paging possibility is known at least to the eNB and the CE-UEs; non-CE-UEs may or may not be informed about this CE-specific paging possibility; however, these non-CE-UEs shall not monitor the CE-specific paging possibility since they may be reached by "normal", i.e. non-CE, paging.

Furthermore, the paging initiated by the eNB shall reach both UEs in RRC-idle state as well as UEs in RRC-connected state. Consequently, the CE-specific paging possibility shall be monitored by UEs in RRC-idle state and UEs in RRC-connected state.

The CE-UEs regularly monitor the CE-specific paging possibility to receive the CE-paging, thereby ensuring that they can be successfully paged.

From the perspective of the eNB, when a page is triggered (e.g. by a system information change), in order to reach the CE-UEs, the eNB will wait for the corresponding paging opportunity given by the CE-specific paging possibility and will then perform a CE page at the CE-specific paging possibility which is monitored by all the CE-UEs in its cell. In a similar manner as for the UE-specific paging possibility, this particularly involves the transmission of the paging notification on the PDCCH at that radio frame and subframe of the CE-specific paging possibility and the corresponding transmission of the paging message on resources of the PDSCH as indicated by the paging notification on the PDCCH. This transmission of the two messages of the CE page is performed by using one appropriate technique of the plurality of CE techniques which are foreseen for achieving the coverage extension, e.g. a repetition technique or a technique where a significantly increased power is used for the transmission.

The CE-UE(s) in the cell of the eNB monitor the CE-specific paging possibility and thus will receive the paging notification on the PDCCH and subsequently the paging message on the PDSCH. Furthermore, since the eNB will use a coverage extension technique for the paging, which is known to the CE-UE(s), the CE-UE(s) will correspondingly react to the CE-paging by e.g. additionally receiving the repetitions of the paging notification and paging message.

The paging message will inform the CE-UE(s) about e.g. the system information change or a warning message etc. Depending on the content of the paging message on the PDSCH, the CE-UE will react accordingly, e.g. by acquiring the system information at the next modification period or by providing the warning message to the user of the CE-UE.

Of course, in a preferred first embodiment the eNB will also want to page the other (non-CE) UEs and for said purpose will page them at all possible paging possibilities, as discussed in the background section, i.e. this will be done without using any CE technique. The non-CE-UEs will each monitor their UE-specific paging possibility and will thus receive one of the paging performed by the eNB.

In general, the CE-specific paging possibility may be different from any of the UE-specific paging possibilities, assignable for the UEs, although this is not strictly necessary for the functioning of the first embodiment. For example, only subframes 1, 2, 3, 6, 7, and 8 might be possible for the CE-specific paging possibility, considering that the other subframes 0, 4, 5, and 9 are candidates for being selected/calculated as the UE-specific paging possibilities.

In one possible embodiment, the CE-UEs may keep on regularly monitoring their UE-specific paging possibility, calculated based on their identity as explained in the background section, in addition to the CE-specific paging possibility. Alternatively, the CE-UEs may not monitor the CE-specific paging possibility and the UE-specific paging possibility at the same time, but may only monitor the CE-specific paging possibility.

Figure 3:
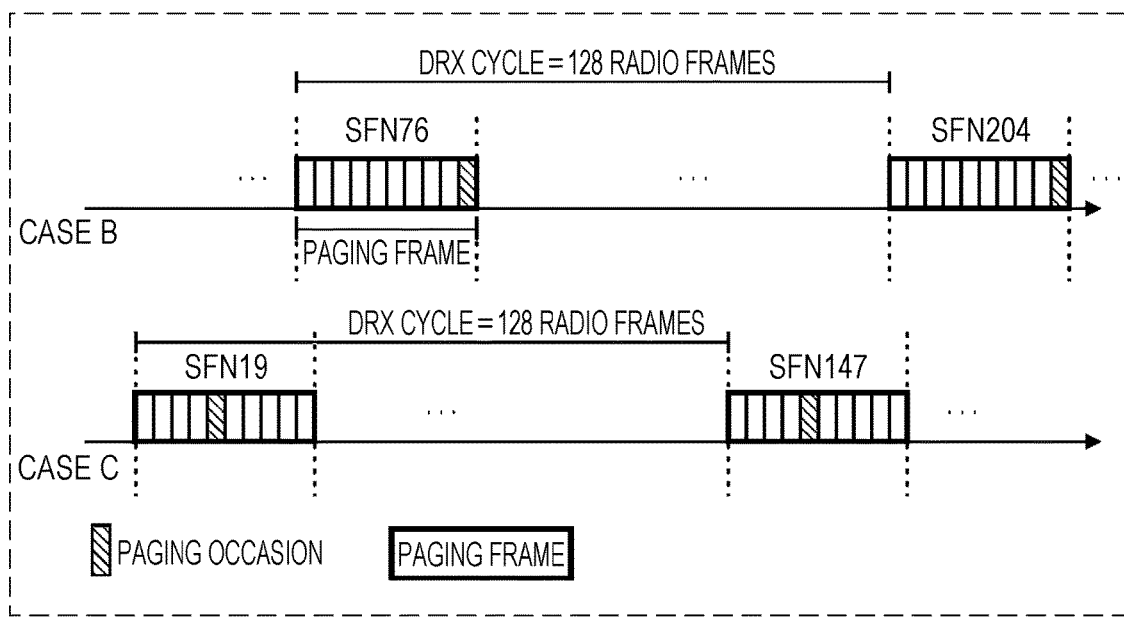
FIG. 3 illustrates cyclical paging frames and paging occasions for two different cases.
Figure 5:
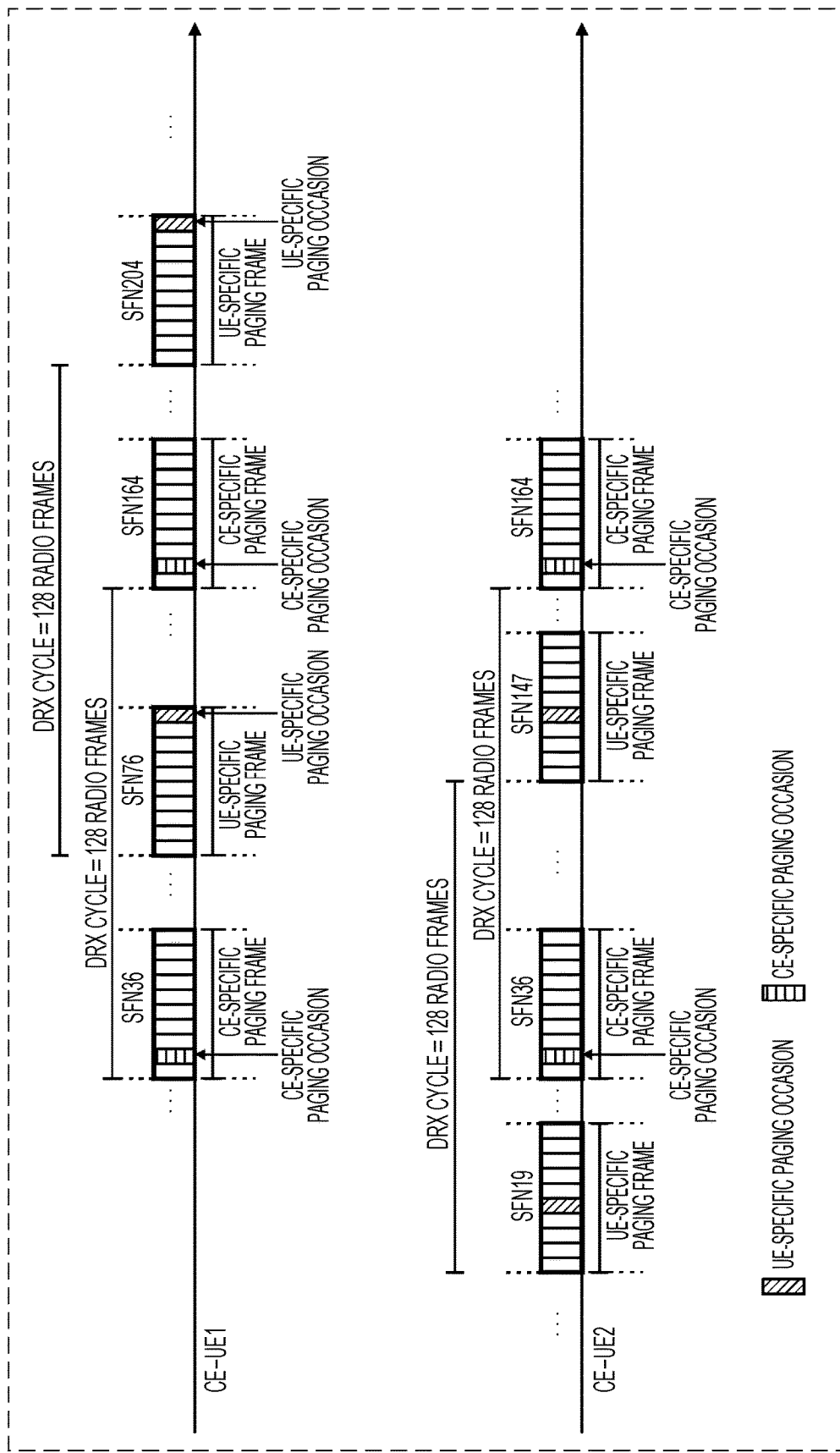
FIG. 5 illustrates the UE-specific paging possibilities and CE-specific paging possibilities of two CE-UEs according to one exemplary first embodiment.

FIG. 5 shows, in a similar manner as FIG. 3, the paging possibilities monitored by two different CE-UEs, UE1 and UE2. As apparent from FIG. 5, it is assumed that CE-UE1 monitors a UE-specific paging possibility at radio frame number 76 and number 204 (76+128) etc., respectively at subframe 9 (see also FIG. 3, case B), and that CE-UE2 monitors a UE-specific paging possibility at radio frame number 19 and 147 (19+128) etc., respectively at subframe 4 (see also FIG. 3, case C). In addition, both CE-UE1 and CE-UE2 monitor the same CE-specific paging possibility, which in this exemplary illustration, is assumed to occur at CE-specific paging frames 36, 164 (36+128) etc. and at respective CE-specific subframe 1.

Figure 6:
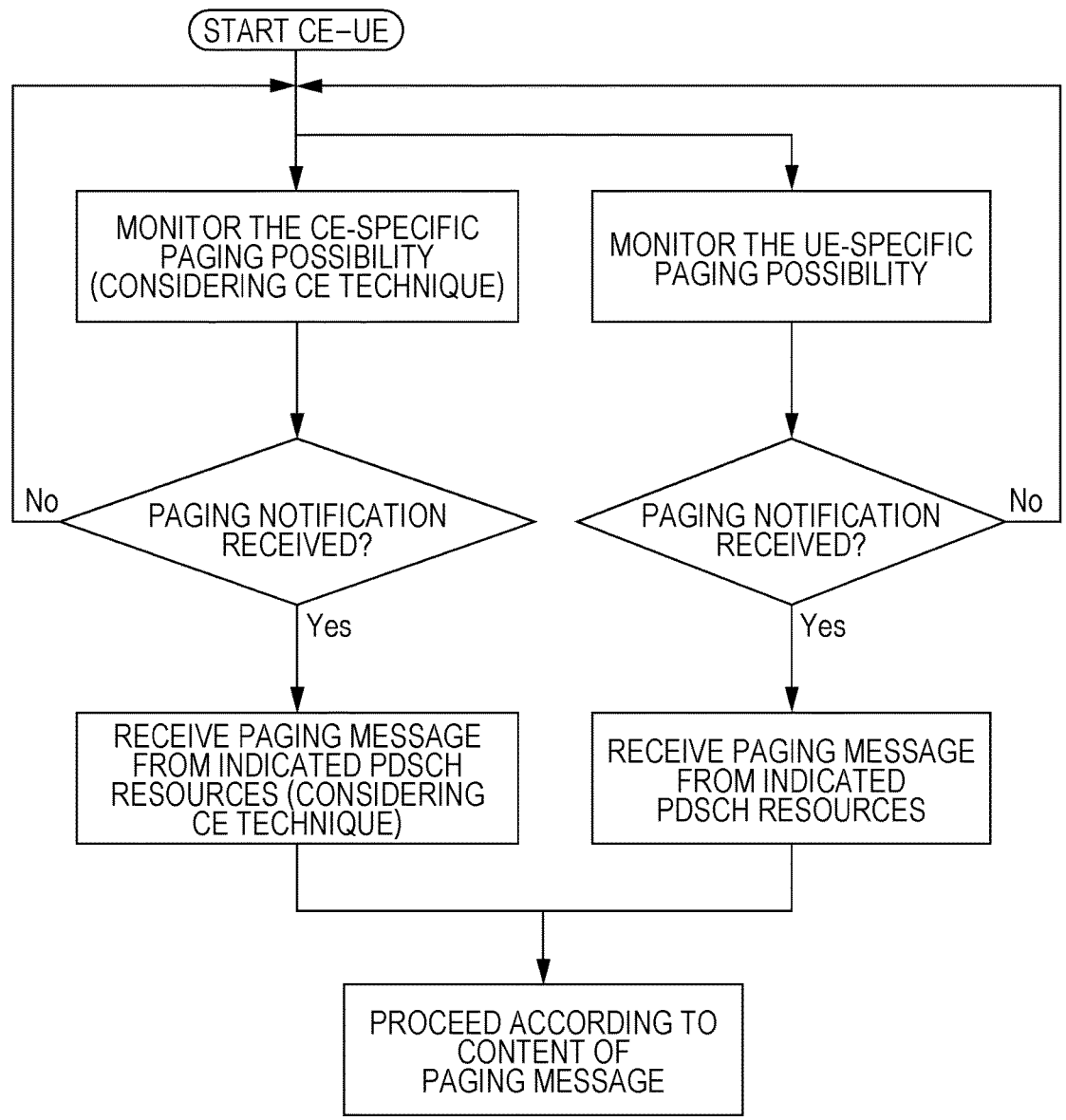
FIG. 6 shows a sequence diagram for the UE behavior according to one exemplary first embodiment.

FIG. 6 shows a sequence diagram for the behavior of a CE-UE for an exemplary variant of the first embodiment. Particularly, it is assumed, in concordance with FIG. 5, that the CE-UE monitors both the CE-specific paging possibility as well as the UE-specific paging possibility, and when it receives the paging notification, the CE-UE will proceed to receive the corresponding paging message at the PDSCH resources indicated by the PDCCH paging notification, either applying or not applying a CE technique. Depending on the content of the paging message, the CE-UE will then react accordingly.

Figure 7:
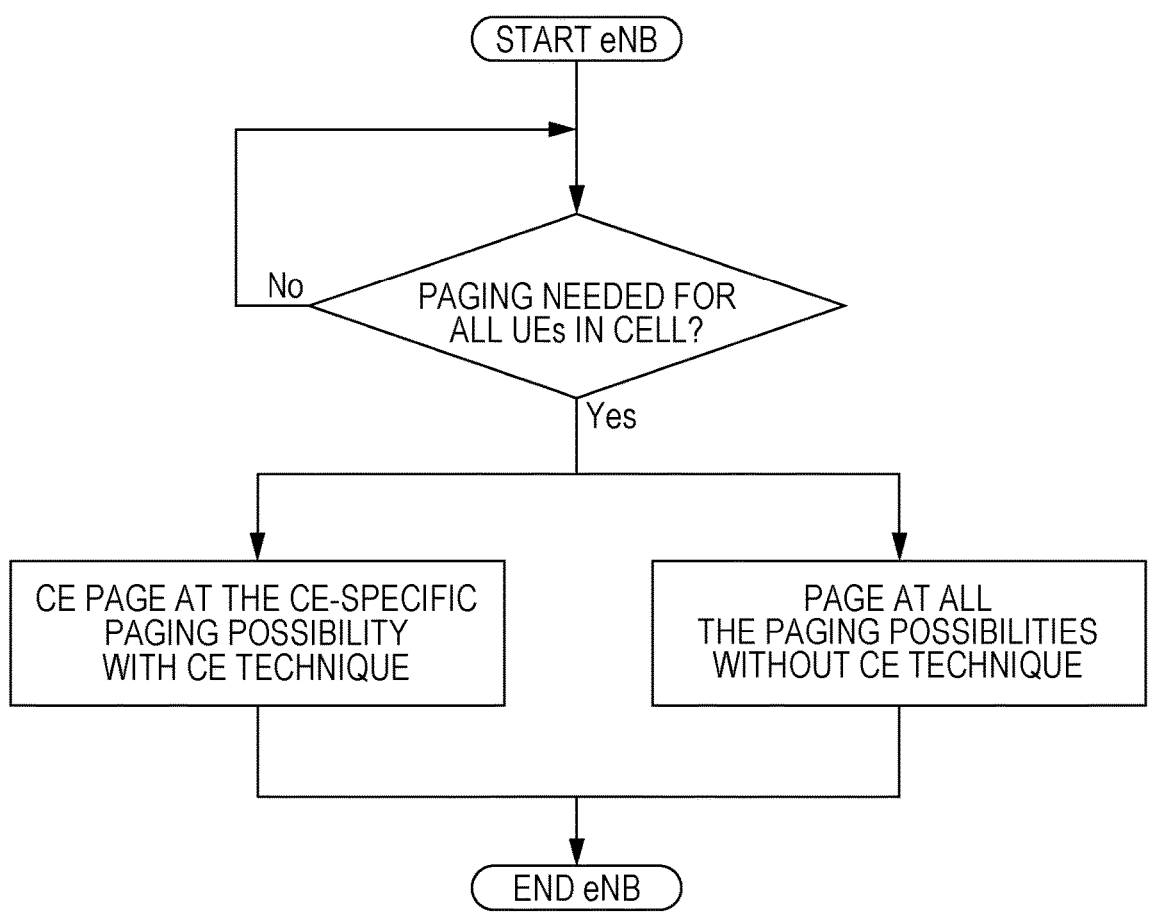
FIG. 7 shows a sequence diagram for the eNB behavior according to one exemplary first embodiment.

FIG. 7 shows a sequence diagram for the corresponding behavior of an eNB which wants to perform a paging. After the eNB decides to perform a paging of all UEs in its cell (e.g. due to system information change), it will proceed to perform the usual page at all possible UE-specific paging possibilities to reach all non-CE-UEs, without using any CE technique. On the other hand, to also reach the CE-UEs, the eNB will perform the CE paging at the CE-specific paging possibility, by using one appropriate CE-technique (e.g. repetition or increased transmission power).

The first embodiment as explained above has the advantage that the use of the coverage extension technique(s) is limited to one particular CE-specific paging possibility, instead of having to be applied to all possible UE-specific paging possibilities. By using one paging possibility, all (or at least a plurality) of CE-UEs can be paged at the same time. Corresponding downlink resources can thus be saved. Furthermore, the CE-specific paging possibility is independent from the real IMSI of any CE-UE.

The CE-specific paging possibility can be defined in a number of different ways, but must always provide a CE-specific paging radio frame number and CE-specific paging subframe number, known to both the CE-UE(s) and the eNB(s).

Figure 4:
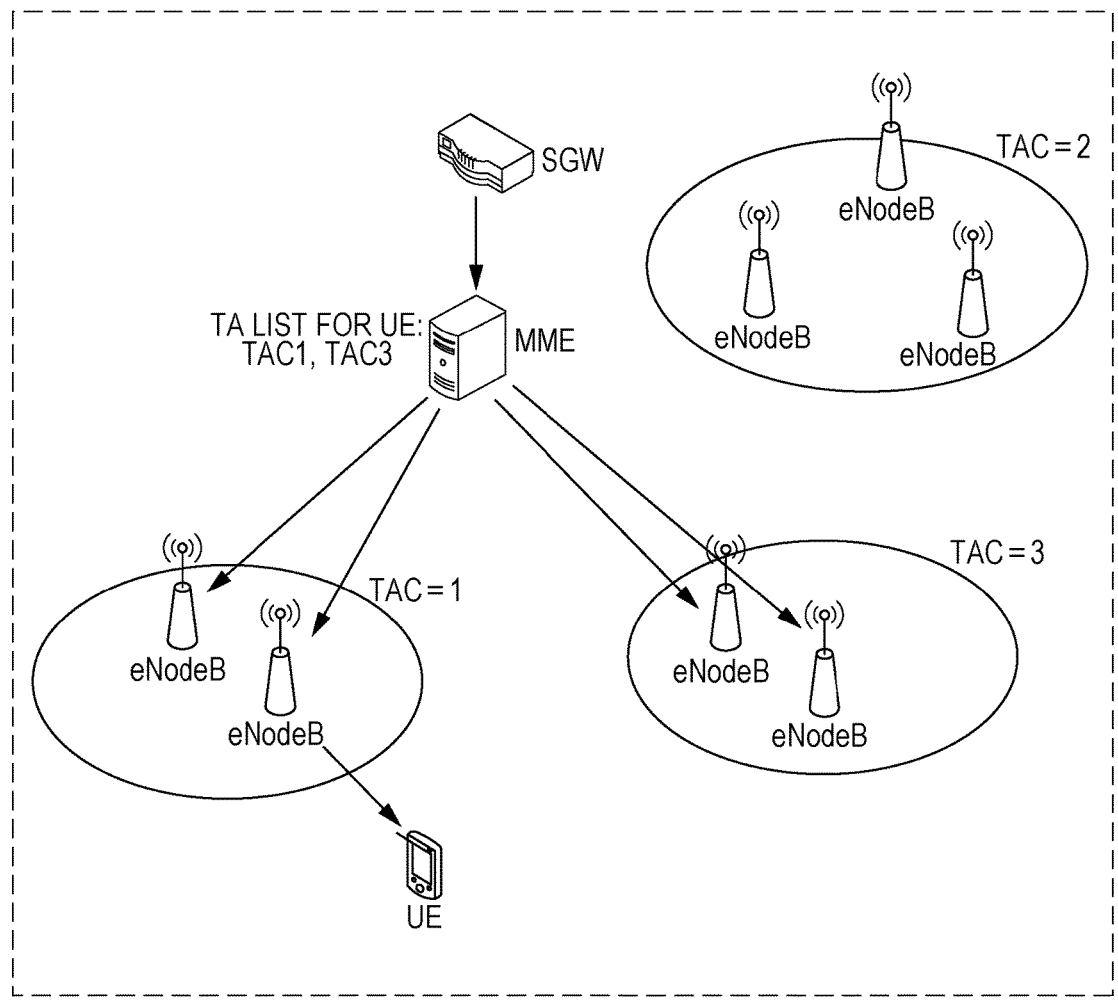
FIG. 4 shows a system overview and message exchange for a paging which is initiated by the MME and spread across the different tracking areas at which the UE is registered.

According to a first variant of the first embodiment, the CE-specific paging possibility is fixed beforehand, e.g. not calculated but directly indicated. In one example, the numbers for the CE-specific paging radio frame and subframe are directly defined e.g. in the CE-UE (e.g. in its USIM, UICC, etc.) and the eNB; in other words, the CE-UE and the eNB would have information indicating particular radio frame and subframe numbers (such as radio frame number 36 and subframe number 1, as for the example of FIG. 4) for the CE-specific paging possibility. This information need not be pre-stored in the CE-UE (e.g. by use of the USIM) but could also be broadcast by the eNB in its cell, e.g. as part of the system information or indicated with a dedicated message when possible, such that the CE-UE(s) learn about the CE-specific paging possibility to be used for CE-paging from the eNB. This would allow different CE-specific paging possibilities to be used by different eNBs.

Alternatively, instead of directly indicating the CE-specific subframe number, the parameters Ns and i_s (already known from the calculation of the UE-specific paging possibility) could be reused in said respect. In particular, the following exemplary extended table can be used, which, in comparison with the table available from TS 36.304 as explained in the background section, includes at least one additional row for e.g. Ns=5 (any other unused Ns number can be used of course) with the possible POs at subframes 1, 2, 3, and 6.

TABLE 3

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |
| 5 | 1 | 2 | 3 | 6 |

For this alternative, Ns and i_s values would be pre-configured for the CE-specific paging possibility such that the CE-UE and eNB could determine, based on the exemplary table above, which CE-specific paging subframe to use. The CE-specific paging radio frame would in this example still be directly indicated by a corresponding radio frame number.

The advantage of this first variant is that the CE-UE(s) would not need to calculate Ns and i_s, but may directly use the indicated numbers for the radio frame and subframe of the CE-specific paging possibility.

According to a second variant of the first embodiment to define the CE-specific paging possibility vis-a-vis the UE-specific paging possibility, the CE-specific paging possibilities are defined by providing different parameter values to the CE-UE(s) than to the non-CE-UEs. It is assumed, that the CE-specific paging subframe is calculated following the equations and principles explained for the UE-specific paging possibility in the background section. By using different parameter values for the same UE, the calculation of the UE-specific paging subframe yields different subframe numbers than the corresponding subframe numbers of the CE-specific paging possibility. As with the first variant explained above, the radio frame number for the CE-specific paging possibility is fixed.

In one example, the parameter with the different value is "nB", i.e. indicating the number of paging subframes per paging cycle (across all UEs in the cell), where one value is defined for CE-UEs and another value is defined for non-CE-UEs. There could however be another parameter broadcasted by the network for indicating rather directly the segregation of paging subframes between CE-UEs and non-CE-UEs.

According to a third variant of the first embodiment to define the CE-specific paging possibility, a CE-specific UE identity (e.g. CE-IMSI) is introduced. When considering the various CE levels a CE-UE can be configured for, a CE-level-specific UE identity can be introduced for each CE level. In any case, the CE-IMSI(s) is known to both the eNB and the CE-UE(s). The CE-specific UE identity(ies) can be provided to the CE-UEs beforehand, e.g. broadcast in the cell, or pre-stored in the SIM/USIM or UICC or even in the Mobile Device, ME. A particular CE-UE and the network will use one of these identities corresponding to the required level of coverage extension support required e.g. one CE-UE deep down in bad radio and the network will use UE-identity1; whereas the same UE when coming back in relatively better radio, but still requiring CE support, will rather use UE-identity2 which is the corresponding use UE-identity for this level of Coverage Extension required. For this to work, it is important that the UE-identity to be used and the corresponding coverage extension required is known to both the network and the CE-UE e.g. by way of specification, or broadcasting etc. and there is a hand-shake between the CE-UE and the network about what level applies to the particular CE-UE at any given point in time. The hand-shake includes the measurement configuration and reporting as described previously.

It is assumed that basically the same calculation and principles are applied when calculating the CE-specific paging possibility as explained for the UE-specific paging possibility in the background section. Both the eNB and the CE-UE(s) can calculate the same CE-(level)-specific paging possibility by the CE-(level)-specific IMSI instead of using the CE-UE's real IMSI.

As already mentioned in the background section, different coverage extension levels can be defined (e.g. 15 dB, 13 dB etc.), where the respective coverage extension technique can be adapted appropriately to ensure achieving the corresponding coverage extension level. When e.g. considering the repetition CE technique, a coverage extension level to ensure 15 dB might require 100 repetitions, whereas less or more repetitions may be necessary to ensure a different CE level. Similarly considerations apply to the other CE-techniques.

A particular CE-UE is configured for one of those coverage extension levels. Correspondingly, according to further examples of the first embodiment, one CE-specific paging possibility is defined per CE level, i.e. a CE-level-specific paging possibility, such that a CE-UE will only monitor the CE-level-specific paging possibility of the CE-level for which it is configured but not other CE-level-specific paging possibilities that are defined for other CE-levels.

A further improvement to the first embodiment is that CE-UEs which are in RRC-connected mode may try to read and receive paging at the UE-specific paging possibilities of other UEs. The UE_ID, which is IMSI mod 1024, can only take up to 1024 different values, and the radio frame is calculated based on "UE_ID mod N" such that only N different radio frames are used in each paging cycle. Consequently, a CE-UE could be configured to monitor some or all of the possible radio frames and subframes available for other UEs. This allows the network to not make as many repetitions as would otherwise be required if the UE was not receiving paging other than the UE-specific paging possibilities.

A further improvement to the first embodiment focuses on when to actually perform a CE page. Until now it has been (silently) assumed that there would be always a CE-UE in a cell, such that any eNB, at any time when paging is triggered, would perform the CE-paging at the CE-specific paging possibility(ies). The eNB is aware of all (CE-)UEs that are in RRC-Connected mode, since these have an active connection with the eNB, and thus the eNB determines whether a CE-UE that require coverage extension is in its cell or not. However, the eNB is not aware of which CE-UEs in RRC-Idle mode are currently in its cell. Consequently, assuming that no CE-UEs in RRC-Connected mode are in the cell of the eNB, the eNB is unaware of whether there is at least one CE-UE in RRC-Idle mode in its cell. To make sure that any possible CE-UEs in Idle mode are reached too, in these cases, the eNB will always have to perform the CE paging. This however may result in a waste of resources for the case where no CE-UE(s) in RRC-Idle mode were in its cell either.

According to this improvement, this waste of resources shall be avoided by providing a procedure that allows the eNB to determine whether any CE-UEs are in its cell, be it in RRC-Idle or RRC-Connected state. To said end, the eNB might first determine whether there are any CE-UEs in RRC-Connected mode, which could be done e.g. by maintaining a table with UE-capability information received from the MME or UE. Subsequently, in case the eNB determines that there are no CE-UEs in RRC-Connected mode, a counting procedure is initiated which allows the eNB to determine/estimate the number of CE-UEs in RRC-idle state in its cell. In one example of a counting procedure the UEs in RRC-Idle on a more or less round robin fashion go to RRC-Connected state and inform the network about the presence of the CE UE in RRC-Idle mode (i.e. about itself). The round robin method can e.g. be implemented using a persistence check method wherein the Idle UEs compare a randomly drawn number against a number broadcasted by the network. Only the one(s) drawing a smaller value will transit to RRC Connected to inform the network. The network can keep the broadcasted value to be small enough so that only a very small percentage of UEs should really pass this test at a given time. This is similar to what is done in MBMS Counting procedure as depicted in RRC specification 3GPP TS 36.331, current version 12.4.1 incorporated herein by reference.

In consequence, the eNB will only perform the CE page when it has determined that there is at least one CE-UE in its cell, be it in RRC-Idle or RRC-Connected state. As a result, the additional resources for a CE-page are not used in vain.

Second Embodiment

As explained above, the first embodiment relates to an improvement for a paging procedure initiated by the eNB, which then shall page all UEs in its cell. The second embodiment to be presented relates to an improvement for a paging procedure that is initiated by the NAS (Non-Access-Stratum), e.g. the MME, and which is dedicated to just a single UE, or a rather limited number of UEs.

In particular, for this second embodiment it is assumed that the paging is initiated by the NAS, for instance in order to establish a call with a particular CE-UE; details in said respect have already been provided in the background section (see also FIG. 4) and apply equally to the second embodiment. In this respect the "call" need not be just a voice call but can also refer to other terminating service like SMS, MMS or Pager etc. For instance, the MME—in response to a corresponding trigger from the SGW in the core network—sends a paging message to all eNBs that belong to the tracking area(s) for which the CE-UE is currently registered. Particularly, the MME does not know where a CE-UE in RRC idle is located. Each eNB belonging to one of the TAs in an associated TA-list, in turn, then has to perform paging so as to page this CE-UE to which the call is destined. Finally, the CE-UE being paged can then establish a connection with the eNB where it is camped and then proceed to accept the incoming call (see also FIG. 4).

In the above-described scenario, the MME informs the eNBs (over the S1 interface) about the capability(ies) of a (CE-)UE, e.g. whether the UE is capable of supporting coverage extension (and optionally which level of coverage extension). As explained before, this general capability information however gives no information on whether a particular CE-capable UE indeed requires coverage extension at the moment or not; e.g. while a CE-capable UE might have been in a basement for a long time, i.e. thus requiring coverage extension for compensating the bad radio conditions, this very same CE-capable UE might in mean time have emerged from the basement and thus might no longer require coverage extension or still require coverage extension but corresponding to a less demanding coverage extension level.

Consequently, according to the second embodiment, a procedure is implemented according to which the eNB can learn whether a CE-capable UE is indeed requiring coverage extension or not at the time of paging. To said end, a new measurement and reporting procedure is implemented between the UE and the eNB as will be explained in detail below.

The CE-capable UE is configured to perform radio measurements that allow determining whether the CE-capable UE is currently indeed requiring coverage extension or not. The radio measurements could refer for example to one or more of the following: Reference Signal Received Power (RSRP), Reference Signal Received Quality (RSRQ), channel quality etc. e.g. as defined in Chapter 5 of 3GPP TS 36.214, "Evolved Universal Terrestrial Radio Access (E-UTRA); Physical layer; Measurements", version 10.1.0, or even current Block Error Rate (BLER) estimates or HARQ operating point and any other suitable measurement target. In any case, a skilled person is well aware of how to determine the current radio conditions of a CE-capable UE that allow, in a subsequent step, to determine whether coverage extension is indeed necessary or not.

After performing the appropriate radio measurements, the CE-capable UE shall then determine whether coverage extension is necessary based on the results of the measurements. In one example, two appropriate thresholds can be defined, to which the measurements results are compared by the CE-capable UE so as to determine the current CE status of the CE-capable UE. For example, an upper threshold can be defined, where if the measurements results (e.g. RSRP or RSRQ) exceed the upper threshold, the CE-capable UE would determine that it does not require coverage extension, i.e. that it currently is a non-CE-UE. Conversely, a different lower threshold can be defined, where if the measurement results (e.g. again RSRP or RSRQ) fall below the lower threshold, the CE-capable would conclude that it does require coverage extension, i.e. that is currently is a CE-UE. Instead of using two thresholds, the determination of whether CE is required or not, could of course also be determined by simply using one threshold, where measurements results exceeding the threshold would mean that coverage extension is not necessary, and measurements results falling below the threshold would mean that coverage extension is necessary. The same technique can also be used for other measurement possibility like for HARQ operating point i.e. where HARQ operating point exceeding the corresponding HARQ operating point-threshold would mean that coverage extension is not necessary, and HARQ operating point falling below the HARQ operating point-threshold would mean that coverage extension is necessary.

The radio measurements and CE status determination can be performed regularly by the CE-capable UE, i.e. at specific, pre-configured, intervals, and/or event triggered (one even for exceeding the threshold in either direction as described above), e.g., and/or triggered by the eNB. In addition to the absolute threshold for the corresponding measurement, the network might also provide the corresponding Hysteresis and Time to Trigger values as described in 3GPP TS 36.331, current version 12.4.1. Hysteresis basically gives a margin or allowance in breaching the threshold in either direction, and the Time to Trigger (TTT) indicates at least how long the said threshold should remain breached/exceeded for the UE to trigger the corresponding event.

Which radio measurements shall be performed, at which intervals, against which threshold(s) the measurement results should be compared, and any other necessary information can be pre-configured in the CE-capable UE or provided to the CE-capable UEs from the eNB, e.g. within a corresponding control message which could be signaled by RRC or Layer2 (MAC) or Layer1 (Physical layer signal) and may contain additional parameters including Hysteresis, TTT and the target object like current/serving and neighbor cell list.

The CE-capable UE has to make sure that the eNB is kept updated on the current CE status, i.e. on whether the CE-capable UE needs coverage extension or not. This may be done e.g. by reporting every change of CE status to the eNB, such that the eNB knows at the time of paging whether a coverage extension technique shall be applied to the paging or not. Of course the same information can be used for DL messages other than paging and also to UL messages including paging response and other non-paging related messages. Depending on whether the CE-capable UE is in idle mode or connected mode, the reporting of the CE status to the eNB may be different. If the CE-capable UE is in RRC connected state and thus has an active connection with the eNB, the CE-capable UE can directly transmit a CE-status report, e.g. RRC Measurement Report, to the eNB.

Since such a direct report is not possible for CE-capable UEs in RRC-IDLE (since no active connection with the eNB is available), the CE-capable UE in idle will report the CE status to the MME, which thus knows whether coverage extension is indeed required or not (independent from the CE-capability of a UE). The MME may either keep the eNB(s) regularly up to date in said respect, or might only provide the corresponding information to the eNB(s) when also triggering the eNB for paging. Of course, also CE-capable UEs in RRC connected could inform the MME, instead of or in addition to the eNB.

In another alternative, the CE-capable UE in idle will report the CE status and UE NAS identity directly to the serving eNB where the UE is camped in currently e.g. upon cell Selection and Reselection(s), which thus knows whether coverage extension is indeed required or not by maintaining a new Table including the UE NAS identity and CE-requirement.

Alternatively, another improvement provides that the CE-capable UEs do not change into RRC-idle state and thus remain all the time in RRC-connected state, such that the CE-capable UE can always transmit the measurement report directly to the eNB. The eNB can ensure that the UE remains in connected state by never sending the RRC Connection Release message to the UE i.e. basically ignoring any inactivity timer in the eNB for this UE.

In any case, the eNB, when being triggered to page a particular CE-capable UE, will be informed about and will consider whether said CE-capable UE indeed requires coverage extension or not. Based on the thus known current CE status of the UE, the eNB will or will not apply an appropriate CE technique to the paging of the CE-capable UE. As explained in detail for the first embodiment already, applying the CE technique to paging involves applying the CE technique to both the paging notification transmitted on the PDCCH and the actual paging message transmitted on the PDSCH as addressed by the PDCCH.

In other words, two measurement events are defined, one referring to the case where the radio measurements indicate that coverage extension is required, and the other referring to the case where the radio measurements indicate that coverage extension is not required. When any of the two events occur, this is reported to the eNB (either directly or via the core network entity, e.g. MME).

Figure 8:
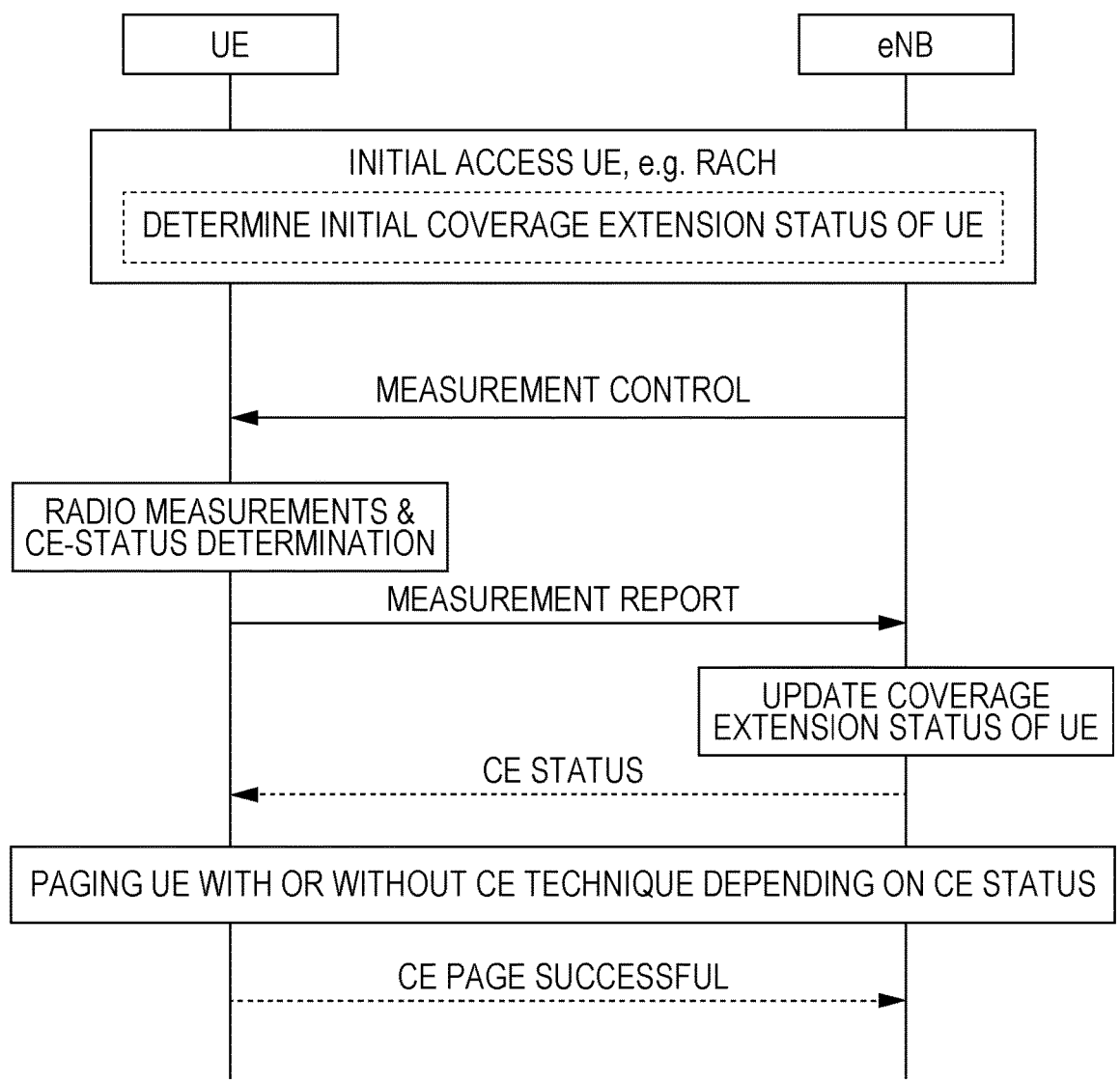
FIG. 8 shows a message sequence diagram for a message exchange for measurement reporting and paging according to one exemplary second embodiment.

FIG. 8 shows a message sequence diagram for an exemplary paging procedure according to the second embodiment. As apparent therefrom, a measurement control message is provided from the eNB to the UE, which is assumed to include all information necessary to configure the UE to perform the radio measurements and to determine the CE-status based on the measurement results. FIG. 8 also shows the measurement report message from the UE to the eNB, which is transmitted to the eNB to allow the eNB to update the CE status of the UE. This allows in consequence that the eNB performs the paging of the UE by using or not using a CE technique depending on the CE status of the UE.

Figure 9:
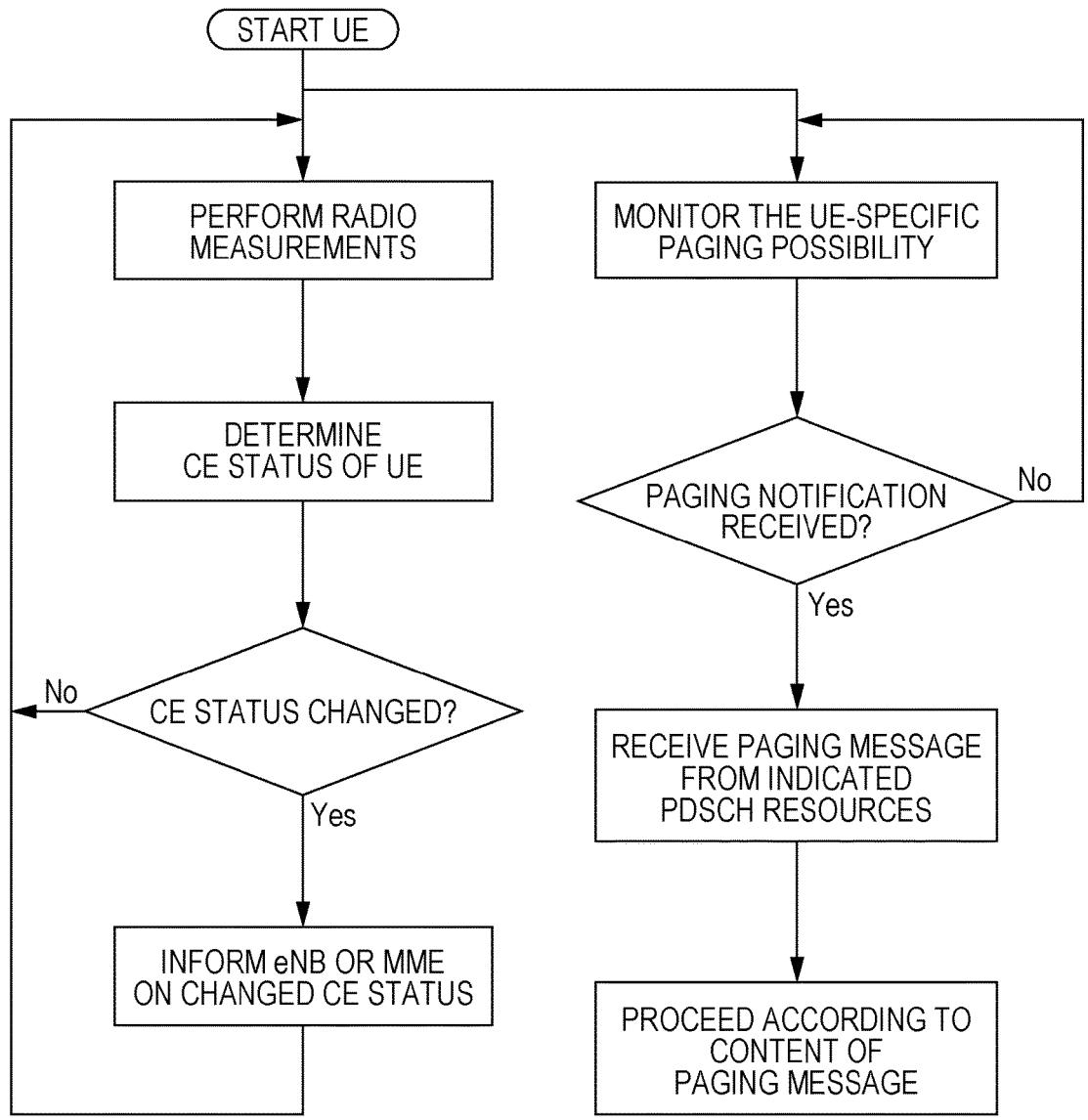
FIG. 9 shows a sequence diagram for the UE behavior according to one exemplary second embodiment.

FIG. 9 shows a simplified sequence process diagram for the CE-capable UE for one particular exemplary second embodiment as explained above where the measurement and reporting procedure is depicted in parallel to the page monitoring procedure.

FIG. 10 shows a simplified sequence process diagram for the eNB as explained above including the reception and update procedure for the CE status of the UE, and the parallel paging procedure which depends on the CE status.

FIG. 8 additionally shows an optional determination of the initial coverage extension status of the UE, which can be done directly upon the initial access of the UE to the eNB (see dashed box). In particular, the UE when initially attaching to a cell (and to the corresponding eNB) usually performs a RACH procedure, which involves e.g. the selection of an appropriate preamble, access slot etc. The CE-capable UE would, during initial access, determine its CE status in order to appropriately select the RACH resources (e.g. preamble, access slot, etc.). Now, the eNB can estimate the radio conditions of the UE, and thus the CE status of the UE, based on the parameters, like preambles, preamble format or even the physical resources that the UE selected to perform the RACH procedure.

Another improvement of the second embodiment, which is also illustrated in FIG. 8 by use of a dashed arrow, refers to a feedback message transmitted from the eNB to the UE about the successful reception of the measurement report, i.e. CE status update, and confirmation that the toggling (between CE and non-CE) is successfully applied at the network side and therefore the UE should also toggle and transmit/receive according to the new toggled state. By e.g. sending back information on the current CE status, the eNB can make sure that the CE-capable UE and the eNB have the same understanding of the CE status, and behave accordingly in a same manner. For instance, if the measurement report is lost, or decoded incorrectly at the eNB, the eNB would not change the CE status, and the UE and eNB would have different CE status (e.g. until the next, successful, measurement report is received by the eNB). Also, even successful reception of the measurement report is not a guarantee that eNB is fine with the toggling for reasons like admission control or for independent toggling evaluation at the eNB side. In this respect, the triggering of a measurement event is just one of the input parameter for the eNB to decide about the said toggling of CE state, and eNB may take the final decision based on cell and System specific considerations. In absence of the feedback message transmitted from the eNB to the UE about the successful reception of the measurement report and confirming that the toggling (between CE and non-CE) is successfully applied at the network side, obviously, different CE status might lead to a waste of radio resources or to an unsuccessful paging, which is avoided by providing a feedback on the successful CE status update.

Still a further improvement of the second embodiment is also illustrated in FIG. 8. As indicated by the dashed arrow, the UE can inform the eNB immediately when a CE page was successful. In particular, instead of waiting to receive e.g. all repetitions of the CE page, as soon as the CE page is successfully received (e.g. the actual paging message was successfully decoded/delivered to the higher layer), the CE-capable UE informs the eNB in said respect. In turn, the eNB can inform the MME in the core network, which may then abort the page in the other eNBs of all the tracking areas (not shown in FIG. 8) pertaining to a corresponding TA-list. Radio resources are thus not wasted by other eNBs.

Third Embodiment

According to a third embodiment, the first embodiment and the second embodiment are combined such that CE devices can be paged both at the NAS level and the AS level (i.e. initiated by NAS and initiated by eNB). Thus, the separation of NAS and AS is maintained as in legacy systems. Furthermore, the first and second embodiments are simple to implement and have no impact on legacy procedures.

One non-limiting and exemplary embodiment provides an improved method for paging all user equipments in a cell, particularly involving user equipments which need coverage extension. Another non-limiting and exemplary embodiment provides an improved method for paging one user equipment in a cell, particularly a user equipment which needs coverage extension.

The independent claims provide non-limiting and exemplary embodiments. Advantageous embodiments are subject to the dependent claims.

According to a first aspect, the present disclosure improves the paging procedure by which a radio base station can page the user equipments in its cell, particularly for the case where the paging shall also reach user equipments which require coverage extension, i.e. user equipments that are in poor radio conditions but support coverage extension techniques as explained in the background section. The first aspect refers to the case were paging is initiated by the radio base station and shall reach all user equipments in the cell of the radio base station; in other words, the paging is not UE specific but cell specific, and can be for example used so as to broadcast a warning message or to inform UEs about an imminent system information change.

Consequently, the paging must reach user equipments that require coverage extension as well as "normal" user equipments which do not require coverage extension. One main idea of the first aspect is the definition of a coverage-extension-specific paging possibility, which is specifically defined for those user equipments that support coverage extension techniques, and more precisely which need coverage extension to be reliably reached. Correspondingly, the CE-UEs not only monitor the UE-specific paging possibility, calculated based on their identities, but additionally monitor a (at least one) different paging possibility dedicated to achieve coverage extension paging. Both CE-user equipments in idle and connected state can be configured to monitor this CE-specific paging possibility. Consequently, in order to reach those CE-UEs, the radio base station pages the CE-UEs at said CE-specific paging possibility, and uses one of the plurality of available techniques (e.g. repetition or increased transmission power) for extending the coverage of the paging and thus to reliably reach the CE-UE.

Like a usual UE-specific paging possibility, this CE-specific paging possibility is defined by a particular radio frame number and subframe number, and occurs regularly e.g. at every paging cycle.

Since the CE-specific paging possibility shall preferably only be monitored by CE-UEs, the radio base station still needs to reach the other non-CE-UEs and can thus, as described in the background section, perform the paging at all possible paging possibilities of a paging cycle, so as to reach all UEs in the cell. In this case the radio base station would not use a coverage extension technique, since the radio base station can be sure that the CE-UEs will be reached by the paging at the CE-specific paging possibility and not for all possible.

One advantage of the above-described first aspect is that, by providing one dedicated paging possibility for CE-UEs, downlink resources can be saved. The coverage extension techniques, which can be a heavy burden to the radio base station(s) are applied in a very limited manner, namely for just one paging possibility.

One set of variants of the first aspect differs as to how this CE-specific paging possibility is defined. In general, it can be said that the CE-specific paging possibility must be known to both the CE-UE(s) and the radio base station(s), so as to ensure that the paging can be successful. However, how exactly the CE-specific paging possibility is defined can vary. One solution is that the radio frame number and the subframe number of the CE-specific paging possibility is fixed beforehand such that corresponding information can be e.g. pre-stored at the radio base station and the CE-UE (e.g. in the USIM), or the radio base station can broadcast same in its cell. Another possible solution is that a plurality of possible paging subframes, generally configured for the system by the radio base station, is divided to be used either as a UE-specific paging subframe or as a CE-specific paging subframe. By correspondingly configuring the paging parameter(s) (e.g. nB) of normal UEs and CE-UEs it is possible that CE-UEs are assigned e.g. one normal UE-specific paging subframe and one CE-specific paging subframe. Still another solution is based on an additional CE-specific UE identity that is assigned exclusively to CE-UEs and which can be used for calculating the CE-specific paging possibility; in addition, as in the prior art, the UE-specific paging possibility is calculated based on the usual identity of the CE-UE (e.g. IMSI).

According to a second aspect, the paging procedure by which a radio base station pages a user equipment which requires coverage extension in its cell is improved. This second aspect refers to the case where the paging is initiated in the core network (NAS) and is destined to a single UE (or a very limited number of UEs), in contrast to the first aspect dealing with cell-wide paging initiated by the eNB. The paging which is directed at a particular CE-UE shall reliably reach the CE-UE, and thus the radio base station shall use one appropriate coverage extension technique for the CE paging. In order to avoid unnecessary CE paging from the radio base station, the CE-capable UEs will implement a measurement and reporting procedure according to which the radio base station is informed as to the current CE status of the UE. The radio base station will thus only perform a CE paging for a CE-capable UE that is indeed currently in the CE status, i.e. currently requiring coverage extension. CE-UEs, although CE capable, will not be paged with a coverage extension technique, if the status of the CE-capable UE, informed to the radio base station, indicates that no coverage extension is actually required by this CE-capable UE at the moment.

Appropriate radio measurements are regularly performed by the CE-capable UE(s) to determine whether coverage extension is necessary or not at the moment. The measurements could also be triggered by the radio base station or a core network entity when being interested in the current CE status. These measurements could include e.g. at least one of RSRQ, RSRP, channel quality, block error rate, or any other suitable measurement parameter. Appropriate threshold(s) can be defined to which the CE-capable UE(s) compare(s) the measurement results to determine whether it requires or not coverage extension.

Consequently, a particular CE-capable UE can change it CE-status, i.e. toggle between being a CE-UE (i.e. indeed requiring coverage extension) and a non-CE-UE (i.e. supporting CE but not requiring CE at the moment).

The radio base station is kept updated on the current CE status of the CE-capable UE and thus (should) knows at the time of paging whether coverage extension is indeed necessary or not for the paging. In order to limit uplink traffic, the informing of the radio base station could be limited to the cases where the CE status of the CE-capable UE is changed, i.e. from non-CE-UE to CE-UE and vice versa. Of course it should also be possible for the CE-capable UE to measure and report such information/measurements periodically even in the absence of said toggling. In this case, the eNB could, based on its implementation, perform some averaging of the received information including measurement reports and determine that a toggling of CE state is indeed helpful. The step of informing may be done, e.g. directly between the CE-capable UE and the radio base station, e.g. for CE-capable UEs that are in connected state and thus may provide the corresponding CE status to the radio base station. Alternatively, the CE-capable UE may report to a core network entity, which in turn may inform the radio base station, at the latest when triggering for paging; this may be done e.g. for those cases where the CE-capable UE is in idle state and thus has no active connection with the radio base station.

Correspondingly, the paging for CE-UE is performed by the radio base station by using a CE technique, whereas paging for a non-CE-UE is performed without using a CE technique. The CE-capable UE appropriately receives the CE paging or normal paging.

Correspondingly, in one general first aspect, the techniques disclosed here feature a method for paging all user equipments in a cell controlled by a radio base station in a mobile communication system. At least one regularly-occurring coverage-extension-specific paging possibility, in short CE-specific paging possibility, is defined for paging user equipments that require coverage extension, in short CE user equipments. The radio base station is capable to use one of a plurality of techniques for achieving a coverage extension for a CE user equipment. The CE user equipments in the cell regularly monitor the at least one CE-specific paging possibility. When the radio base station determines to page all the user equipments in the cell, the radio base station pages the CE user equipments in the cell at the CE-specific paging possibility, using one of the plurality of techniques for achieving the coverage extension.

According to an advantageous variant of the first aspect which can be used in addition or alternatively to the above, a plurality of UE-specific paging possibilities is defined for paging a specific user equipment in the cell of the radio base station. The CE user equipments and non-CE user equipments each monitor a respective UE-specific paging possibility out of the plurality of UE-specific paging possibilities. The radio base station—upon determining to page all the user equipments in the cell—additionally performs paging at all of the plurality of UE-specific paging possibilities without using one of the plurality of techniques for achieving coverage extension. According to a further example, each of the plurality of UE-specific paging possibilities is different from the at least one CE-specific paging possibility.

According to an advantageous variant of the first aspect which can be used in addition or alternatively to the above, each of the at least one CE-specific paging possibility refers to radio resources of a control channel defined by a radio frame number and subframe number and is repeated every paging cycle. The at least one CE-specific paging possibility is only monitored by CE user equipments. For example, the at least one CE-specific paging possibility is monitored by CE user equipments in idle state and CE user equipments in connected state.

According to an advantageous variant of the first aspect which can be used in addition or alternatively to the above, the step of paging includes transmitting by the radio base station a first paging notification at radio resources of a control channel specified by the at least one CE-specific paging possibility, and includes transmitting by the radio base station a second paging message at radio resources of another channel specified by the first paging notification. For example, the technique for achieving the coverage extension is applied to both steps of transmitting the first paging notification and of transmitting the second paging message.

According to an advantageous variant of the first aspect which can be used in addition or alternatively to the above, the plurality of techniques for achieving the coverage extension comprise at least one of a repetition technique where a message is repeated by the radio base station for a pre-configured number of times, an increase in transmission power, where a message is transmitted by the radio base station with an increased transmission power, a bundling technique where a same message is transmitted in a plurality of consecutive subframes, and a spreading technique where a message is transmitted by a larger resource, e.g. via a larger frequency-time resource or channelization code.

According to an advantageous variant of the first aspect which can be used in addition or alternatively to the above, the step of determining by the radio base station to page all user equipments in the cell is triggered by a change of system information applicable to the cell controlled by the radio base station or by the presence of a message, e.g. a warning message, to be broadcast in the cell controlled by the radio base station.

According to an advantageous variant of the first aspect which can be used in addition or alternatively to the above, each of the at least one CE-specific paging possibility refers to radio resources of a control channel defined by a radio frame number and a subframe number which are pre-configured such that the radio frame number and the subframe number are fixed for the CE-specific paging possibility. For example, information to determine the pre-configured radio frame number and the pre-configured subframe number is stored in a Universal Subscriber Identity Module, USIM, of the CE user equipment, or broadcast by the radio base station in the cell. Further exemplary, the pre-configured subframe number is 1, 2, 3, 6, 7, or 8.

According to an advantageous variant of the first aspect which can be used in addition or alternatively to the above, a plurality of paging possibilities are defined for paging in the cell of the radio base station, wherein a first value of at least one parameter for calculating the UE-specific paging possibility is different from a second value of the at least one parameter for calculating a CE-specific paging possibility such that the plurality of paging possibilities are divided to be used either as the CE-specific paging possibility or the UE-specific paging possibility. CE user equipments are configured to use the first value of the at least one parameter for calculating the UE-specific paging possibility and to use the second value of the at least one parameter for calculating the CE-specific paging possibility. Non-CE user equipments are configured to use the first value of the at least one parameter for calculating the UE-specific paging possibility and to not calculate the CE-specific paging possibility.

According to an advantageous variant of the first aspect which can be used in addition or alternatively to the above, 6, wherein CE user equipments are assigned a CE-specific user equipment identity based on which the CE-specific paging possibility is calculated by the radio base station and the CE user equipments. For example, the CE-specific user equipment identity is the same for all CE-configured user equipments, and the CE-specific user equipment identity is stored in a Universal Subscriber Identity Module, USIM, of the CE user equipment or broadcast by the radio base station in the cell. Further for example, a plurality of different levels of coverage extension is defined, and wherein for each level of coverage extension a different CE-specific user equipment identity is defined.

According to an advantageous variant of the first aspect which can be used in addition or alternatively to the above, wherein a plurality of different levels of coverage extension is defined, and wherein for each level of coverage extension a different CE-specific paging possibility is defined for paging the CE user equipments configured for that level of coverage extension.

According to an advantageous variant of the first aspect which can be used in addition or alternatively to the above, the radio base station determines whether there are CE user equipments in idle state in its cell by performing a counting procedure where the CE user equipments in idle state inform the radio base station about their presence in the cell controlled by the radio base station. For example, the determination is only performed in case there are no CE user equipments in connected state in the cell.

Correspondingly, in one general first aspect, the techniques disclosed here feature a user equipment located in a cell controlled by a radio base station in a mobile communication system. The user equipment, in short CE user equipment, requires coverage extension, wherein at least one regularly-occurring coverage-extension-specific paging possibility, in short CE-specific paging possibility, is defined for the CE user equipment. The radio base station is capable to use one of a plurality of techniques for achieving a coverage extension for the CE user equipment. A processor of the CE user equipment regularly monitors the at least one CE-specific paging possibility. A receiver of the CE user equipment receives a paging from the radio base station at the CE-specific paging possibility, using one of the plurality of techniques for achieving the coverage extension.

According to an advantageous variant of the first aspect which can be used in addition or alternatively to the above, a plurality of UE-specific paging possibilities is defined for paging a specific user equipment in the cell of the radio base station. The processor of the CE user equipment monitors a respective UE-specific paging possibility out of the plurality of UE-specific paging possibilities. In a further example, each of the plurality of UE-specific paging possibilities is different from the at least one CE-specific paging possibility.

According to an advantageous variant of the first aspect which can be used in addition or alternatively to the above, wherein each of the at least one CE-specific paging possibility refers to radio resources of a control channel defined by a radio frame number and subframe number and is repeated every paging cycle. In a further example, the at least one CE-specific paging possibility is monitored by the CE user equipment when in idle state and when in connected state.

According to an advantageous variant of the first aspect which can be used in addition or alternatively to the above, the receiver receiving the paging includes: receiving a first paging notification at radio resources of a control channel specific by the at least one CE-specific paging possibility, and includes receiving a second paging message at radio resources of another channel specific by the first paging notification. In a further example, the technique for achieving the coverage extension is used by the CE user equipment to both receive the first paging notification and receive the second paging message.

According to an advantageous variant of the first aspect which can be used in addition or alternatively to the above, each of the at least one CE-specific paging possibility refers to radio resources of a control channel defined by a radio frame number and a subframe number which are pre-configured such that the radio frame number and the subframe number are fixed for the CE-specific paging possibility. In a further example, a memory of the CE user equipment is adapted to store information to determine the pre-configured radio frame number and the pre-configured subframe number. Exemplarily, the memory is a Universal Subscriber Identity Module, USIM, of the CE user equipment. Or, the receiver of the CE user equipment receives information to determine the pre-configured radio frame number and the pre-configured subframe number, broadcast by the radio base station in the cell.

According to an advantageous variant of the first aspect which can be used in addition or alternatively to the above, the CE user equipment is assigned a CE-specific user equipment identity, wherein the processor of the CE user equipment is adapted to calculate the CE-specific paging possibility based on the CE-specific user equipment identity. Exemplarily, the CE-specific user equipment identity is the same for all CE-configured user equipments. In a further example, a plurality of different levels of coverage extension is defined. For each level of coverage extension a different CE-specific user equipment identity is defined.

Correspondingly, in one general first aspect, the techniques disclosed here feature a radio base station for paging all user equipments in a cell controlled by the radio base station in a mobile communication system. At least one regularly-occurring coverage-extension-specific paging possibility, in short CE-specific paging possibility, is defined for paging user equipments that require coverage extension, in short CE user equipments. The radio base station is capable to use one of a plurality of techniques for achieving a coverage extension for a CE user equipment. A processor of the radio base station determines whether to page all the user equipments in the cell. A transmitter of the radio base station pages the CE user equipments in the cell at the CE-specific paging possibility, using one of the plurality of techniques for achieving the coverage extension.

According to an advantageous variant of the first aspect which can be used in addition or alternatively to the above, a plurality of UE-specific paging possibilities are defined for paging a specific user equipment in the cell of the radio base station, wherein transmitter of the radio base station—upon the processor determining to page all the user equipments in the cell—additionally pages at all of the plurality of UE-specific paging possibilities without using one of the plurality of techniques for achieving coverage extension. For example, each of the plurality of UE-specific paging possibilities is different from the at least one CE-specific paging possibility.

According to an advantageous variant of the first aspect which can be used in addition or alternatively to the above, the transmitter of the radio base station is adapted to transmit a first paging notification at radio resources of a control channel specified by the at least one CE-specific paging possibility, and to transmit a second paging message at radio resources of another channel specified by the first paging notification. Exemplarily, the technique for achieving the coverage extension is applied to both the transmitting of the first paging notification and the transmitting of the second paging message.

According to an advantageous variant of the first aspect which can be used in addition or alternatively to the above, the processor determines to page all the user equipments in the cell when being triggered by a change of system information applicable to the cell controlled by the radio base station or by the presence of a message, e.g. a warning message, to be broadcast in the cell controlled by the radio base station.

According to an advantageous variant of the first aspect which can be used in addition or alternatively to the above, each of the at least one CE-specific paging possibility refers to radio resources of a control channel defined by a radio frame number and a subframe number which are pre-configured such that the radio frame number and the subframe number are fixed for the CE-specific paging possibility. Exemplarily, information to determine the pre-configured radio frame number and the pre-configured subframe number is stored in the radio base station, wherein the transmitter of the radio base station broadcasts the information to determine the pre-configured radio frame number and subframe number.

According to an advantageous variant of the first aspect which can be used in addition or alternatively to the above, a CE-specific user equipment identity is assigned to the CE user equipments, wherein the processor of the radio base station is adapted to calculate the CE-specific paging possibility based on the CE-specific user equipment identity. Exemplarily, the transmitter of the radio base station is adapted to broadcast the CE-specific user equipment identity in the cell.

According to an advantageous variant of the first aspect which can be used in addition or alternatively to the above, the processor of the radio base station determines whether there are CE user equipments in idle state in its cell by performing a counting procedure. Exemplarily, the determination is only performed in case there are no CE user equipments in connected state in the cell.

Correspondingly, in one general second aspect, the techniques disclosed here feature a method for paging a user equipment in a cell controlled by a radio base station in a mobile communication system. The user equipment supports coverage extension techniques, wherein the radio base station is capable to use one of a plurality of techniques for achieving a coverage extension for the CE-capable user equipment. Radio measurements are performed by the CE-capable user equipment, which determines whether coverage extension is necessary or not, based on the results of the radio measurements. The radio base station is informed about whether the CE-capable user equipment needs coverage extension or not, based on the determination result. When paging the CE-capable user equipment, the radio base station applies or not applies one of the plurality of techniques for achieving coverage extension depending on whether coverage extension is necessary or not for the CE-capable user equipment.

According to an advantageous variant of the second aspect which can be used in addition or alternatively to the above, the radio measurements performed by the CE-capable user equipment include measurements of a Reference Signal Received Power, RSRP, and/or Reference Signal Received Quality, RSRQ, and/or a channel quality, and/or a block error rate and/or HARQ operating point.

According to an advantageous variant of the second aspect which can be used in addition or alternatively to the above, the step of determining whether coverage extension is necessary comprises the step of comparing by the CE-capable user equipment the result of the radio measurements with a first threshold to determine whether coverage extension is necessary. For example, the comparison determines that coverage extension is necessary when the result of the radio measurements falls below the first threshold. The step further comprises comparing by the CE-capable user equipment the result of the radio measurements with a second threshold to determine whether coverage extension is not necessary. For example, the comparison determines that coverage extension is not necessary when the result of the radio measurement exceeds the second threshold.

According to an advantageous variant of the second aspect which can be used in addition or alternatively to the above, the step of informing the radio base station about the CE-capable user equipment needing coverage extension or not, includes the steps of either transmitting by the CE-capable user equipment information about whether the CE-capable user equipment needs coverage extension or not to the radio base station. In this case, for example the CE-capable user equipment is in a connected state. In a further example, it is avoided that the CE-capable user equipment is changing into the idle state by keeping it in the connected state. Alternatively, the step of informing includes the steps of transmitting by the CE-capable user equipment information about whether the CE-capable user equipment needs coverage extension or not to a core network entity. In this case, the core network entity provides the received information to the radio base station. For example, the CE-capable user equipment is in a connected state or in an idle state. In a further example, the core network entity is a mobility management entity.

According to an advantageous variant of the second aspect which can be used in addition or alternatively to the above, the radio base station is triggered to page the CE-capable user equipment by a core network entity that initiates and controls the paging, preferably wherein the core network entity initiating the paging is a mobility management entity.

According to an advantageous variant of the second aspect which can be used in addition or alternatively to the above, the steps of performing the radio measurements and of determining whether coverage extension is necessary or not is performed regularly at a pre-configured time interval and/or triggered by the radio base station.

According to an advantageous variant of the second aspect which can be used in addition or alternatively to the above, the step of informing the radio base station is only performed when the result of the determination is different from the result of the determination previously informed to the radio base station.

According to an advantageous variant of the second aspect which can be used in addition or alternatively to the above, the radio base station determines whether the CE-capable user equipment needs coverage extension or not based on the radio resources selected by the CE-capable user equipment for initially attaching to the radio base station; for example, based on the selected preamble or access slot used for a random access procedure performed by the CE-capable user equipment when initially attaching to the radio base station.

According to an advantageous variant of the second aspect which can be used in addition or alternatively to the above, the step of paging the CE-capable user equipment comprises the steps of transmitting by the radio base station a first paging notification at radio resources of a control channel specified by a paging possibility specific to the CE-capable user equipment, and transmitting by the radio base station a second paging message at radio resources of another channel specified by the first paging notification. In a further example, the technique for achieving the coverage extension is applied to both steps of transmitting the first paging notification and of transmitting the second paging message.

According to an advantageous variant of the second aspect which can be used in addition or alternatively to the above, upon successfully being paged by the radio base station, the CE-capable user equipment informs the radio base station about the successful paging, and the radio base station can inform a core network entity responsible for initiating the paging about the successful paging.

Correspondingly, in one general second aspect, the techniques disclosed here feature a user equipment located in a cell controlled by a radio base station in a mobile communication system. The user equipment, in short CE user equipment, supports coverage extension techniques. The radio base station is capable to use one of a plurality of techniques for achieving a coverage extension for the CE-capable user equipment. A processor of the CE user equipment performs radio measurements, and determines whether coverage extension is necessary or not, based on the results of the radio measurements. A transmitter of the CE user equipment informs the radio base station about whether the CE-capable user equipment needs coverage extension or not, based on the determination result. A receiver of the CE user equipment receives paging from the radio base station, applying or not applying one of the plurality of techniques for achieving coverage extension depending on whether coverage extension is necessary or not.

According to an advantageous variant of the second aspect which can be used in addition or alternatively to the above, the radio measurements performed by the CE-capable user equipment include measurements of a Reference Signal Received Power, RSRP, and/or Reference Signal Received Quality, RSRQ, and/or a channel quality, and/or a block error rate and/or HARQ operating point.

According to an advantageous variant of the second aspect which can be used in addition or alternatively to the above, the processor determines whether coverage extension is necessary or not by comparing the result of the radio measurements with a first threshold to determine whether coverage extension is necessary. For example, the comparison determines that coverage extension is necessary when the result of the radio measurements falls below the first threshold. Furthermore, the result of the radio measurements is compared with a second threshold to determine whether coverage extension is not necessary. For example, the comparison determines that coverage extension is not necessary when the result of the radio measurement exceeds the second threshold.

According to an advantageous variant of the second aspect which can be used in addition or alternatively to the above, the transmitter informs the radio base station by transmitting information about whether the CE-capable user equipment needs coverage extension or not to the radio base station. For example, the CE-capable user equipment is in a connected state, and furthermore it is avoided that the CE-capable user equipment is changing into the idle state by keeping it in the connected state. Alternatively, information about whether the CE-capable user equipment needs coverage extension or not is transmitted to a core network entity. The core network entity provides the received information to the radio base station, preferably wherein the CE-capable user equipment is in a connected state or in an idle state.

According to an advantageous variant of the second aspect which can be used in addition or alternatively to the above, the processor performing the radio measurements and determining whether coverage extension is necessary or not is performed regularly at a pre-configured time interval and/or triggered by the radio base station.

According to an advantageous variant of the second aspect which can be used in addition or alternatively to the above, the transmitter informs the radio base station only when the result of the determination is different from the result of the determination previously informed to the radio base station.

According to an advantageous variant of the second aspect which can be used in addition or alternatively to the above, the receiver receiving the paging includes receiving a first paging notification at radio resources of a control channel specific by a paging possibility specific to the CE-capable user equipment, and receiving a second paging message at radio resources of another channel specific by the first paging notification. For example, the technique for achieving the coverage extension is used by the CE user equipment to both receive the first paging notification and receive the second paging message.

According to an advantageous variant of the second aspect which can be used in addition or alternatively to the above, the transmitter is further adapted to inform the radio base station about the successful paging.

Correspondingly, in one general second aspect, the techniques disclosed here feature a radio base station for paging a user equipment in a cell controlled by the radio base station in a mobile communication system. The user equipment supports coverage extension techniques. The radio base station is capable to use one of a plurality of techniques for achieving a coverage extension for the CE-capable user equipment. A receiver of the radio base station receives information about whether the CE-capable user equipment needs coverage extension or not. A transmitter of the radio base station, when paging the CE-capable user equipment, applies or not applies one of the plurality of techniques for achieving coverage extension depending on whether coverage extension is necessary or not for the CE-capable user equipment.

According to an advantageous variant of the second aspect which can be used in addition or alternatively to the above, the receiver receiving the information includes receiving from the CE-capable user equipment or from a core network entity the information about whether the CE-capable user equipment needs coverage extension or not.

According to an advantageous variant of the second aspect which can be used in addition or alternatively to the above, the transmitter of the radio base station transmit a first paging notification at radio resources of a control channel specified by a paging possibility specific to the CE user equipment, and transmit a second paging message at radio resources of another channel specified by the first paging notification. For example, the technique for achieving the coverage extension is applied to both the transmitting of the first paging notification and the transmitting of the second paging message.

According to an advantageous variant of the second aspect which can be used in addition or alternatively to the above, a receiver of the radio base station receives information about the successful paging of the CE user equipment, and the transmitter of the radio base station informs a core network entity responsible for initiating the paging about the successful paging.

Hardware and Software Implementation of the Present Disclosure

Other exemplary embodiments relate to the implementation of the above described various embodiments using hardware and software. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A user equipment, comprising:
circuitry, which, in operation, when the user equipment, which is coverage enhancement (CE)-capable, has informed a base station that the user equipment is in CE, determines to use a paging possibility specific to CE-capable user equipment based on information which is stored in a Universal Subscriber Identity Module (USIM) of the user equipment or which is broadcast by the base station; and
a receiver, coupled to the circuitry and which, in operation, receives a paging notification of a physical downlink control channel (PDCCH) at the paging possibility and a paging message at radio resources of a physical downlink shared channel (PDSCH) indicated by the paging notification, the paging notification and the paging message being transmitted by the base station using at least one CE technique.

2. The user equipment according to claim 1, wherein the paging possibility specific to the CE-capable user equipment comprises radio resources of the PDCCH defined by a radio frame number and a subframe number which are determined based on the information which is stored in the USIM of the user equipment.

3. The user equipment according to claim 1, wherein the paging possibility specific to the CE-capable user equipment comprises radio resources of the PDCCH defined by a radio frame number and a subframe number which are determined based on the information which is broadcast by the base station.

4. The user equipment according to claim 1, wherein at least one paging possibility of paging possibilities specific to the CE-capable user equipment is different from a paging possibility specific to a non-CE-capable user equipment.

5. The user equipment according to claim 1, wherein the at least one CE technique comprises repetition where the paging notification is repeated by the base station a determined number of times.

6. The user equipment according to claim 5, wherein the determined number of times of the repetition is different between at least two different CE levels which are determined by the CE-capable user equipment.

7. A method, comprising:
when a user equipment, which is coverage enhancement (CE)-capable, has informed a base station that the user equipment is in CE, determining to use a paging possibility specific to CE-capable user equipment based on information which is stored in a Universal Subscriber Identity Module (USIM) of the user equipment or which is broadcast by the base station; and
receiving a paging notification of a physical downlink control channel (PDCCH) at the paging possibility and a paging message at radio resources of a physical downlink shared channel (PDSCH) indicated by the paging notification, the paging notification and the paging message being transmitted by the base station using at least one CE technique.

8. The method according to claim 7, wherein the paging possibility specific to the CE-capable user equipment comprises radio resources of the PDCCH defined by a radio frame number and a subframe number which are determined based on the information which is stored in the USIM of the user equipment.

9. The method according to claim 7, wherein the paging possibility specific to the CE-capable user equipment comprises radio resources of the PDCCH defined by a radio frame number and a subframe number which are determined based on the information which is broadcast by the base station.

10. The method according to claim 7, wherein at least one paging possibility of paging possibilities specific to the CE-capable user equipment is different from a paging possibility specific to a non-CE-capable user equipment.

11. The method according to claim 7, wherein the at least one CE technique comprises repetition where the paging notification is repeated by the base station a determined number of times.

12. The method according to claim 11, wherein the determined number of times of the repetition is different between at least two different CE levels which are determined by the CE-capable user equipment.

* * * * *